United States Patent
Sugiyama

(10) Patent No.: US 11,300,859 B2
(45) Date of Patent: Apr. 12, 2022

(54) PROJECTOR HAVING COOLER

(71) Applicant: SEIKO EPSON CORPORATION, Tokyo (JP)

(72) Inventor: Nobuo Sugiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 50 days.

(21) Appl. No.: 16/898,598

(22) Filed: Jun. 11, 2020

(65) Prior Publication Data

US 2020/0393746 A1 Dec. 17, 2020

(30) Foreign Application Priority Data

Jun. 12, 2019 (JP) .............................. JP2019-109548

(51) Int. Cl.
*G03B 21/16* (2006.01)
*H04N 9/31* (2006.01)

(52) U.S. Cl.
CPC ........... *G03B 21/16* (2013.01); *H04N 9/3144* (2013.01); *H04N 9/3155* (2013.01); *H04N 9/3194* (2013.01)

(58) Field of Classification Search
CPC ............................... G03B 21/16; H04N 9/3144
See application file for complete search history.

(56) References Cited

U.S. PATENT DOCUMENTS

| | | | |
|---|---|---|---|
| 5,032,021 A | 7/1991 | Kanatani et al. | |
| 6,713,973 B2* | 3/2004 | Erhardt | H05B 41/2928 315/291 |
| 7,436,399 B2* | 10/2008 | Naito | H04N 5/74 345/169 |
| 7,438,420 B2* | 10/2008 | Harada | H04N 9/3155 315/117 |

(Continued)

FOREIGN PATENT DOCUMENTS

| | | |
|---|---|---|
| JP | H02-044144 A | 2/1990 |
| JP | H11-057383 A | 3/1999 |

(Continued)

OTHER PUBLICATIONS

May 27, 2021 Office Action Issued in U.S. Appl. No. 16/894,060.

(Continued)

*Primary Examiner* — Bao-Luan Q Le
(74) *Attorney, Agent, or Firm* — Oliff PLC

(57) ABSTRACT

A projector including cooling target includes a controller and a cooler configured to cool the cooling target based on transformation of a refrigerant into gas. The cooler includes a refrigerant generator and a cooling air blower. The controller is configured to perform a first control and a second control. The controller performs one of the first and second controls based on information on the activation of the projector from the activation of the projector. In the second control, the controller performs at least one of a luminance control and an output control, the luminance control which reduces the luminance of the light outputted from the light (Continued)

source to a value smaller than the luminance of the light in the first control, and the output control which increases the output of the cooling air blower to a value larger than the output of the cooling air blower in the first control.

14 Claims, 10 Drawing Sheets

(56) References Cited

U.S. PATENT DOCUMENTS

| | | | |
|---|---|---|---|
| 7,448,759 B2* | 11/2008 | Fukano | H04N 5/74 353/85 |
| 7,737,387 B2* | 6/2010 | Hsu | G03B 21/16 250/205 |
| 7,824,038 B2* | 11/2010 | Yun | H05B 41/46 353/58 |
| 7,891,819 B2 | 2/2011 | Osumi | |
| 8,277,050 B2* | 10/2012 | Furumi | G03B 21/16 353/57 |
| 8,517,540 B2 | 8/2013 | Terao | |
| 8,777,423 B2* | 7/2014 | Okada | G03B 21/2086 353/85 |
| 8,979,280 B2* | 3/2015 | Sakamoto | G03B 21/206 353/85 |
| 9,022,573 B2* | 5/2015 | Shioya | G03B 21/16 353/57 |
| 9,039,192 B2* | 5/2015 | Okazawa | G03B 21/16 353/57 |
| 9,104,059 B2* | 8/2015 | Shioya | G03B 21/2026 |
| 9,116,419 B2* | 8/2015 | Terashima | H04N 9/3144 |
| 9,316,895 B2* | 4/2016 | Kubo | G03B 21/16 |
| 9,429,827 B2* | 8/2016 | Kubo | G03B 21/2026 |
| 9,666,109 B2* | 5/2017 | Fukutomi | G06T 3/4007 |
| 9,857,671 B2 | 1/2018 | Asano | |
| 10,643,547 B2* | 5/2020 | Naitou | H04N 9/3182 |
| 2002/0191159 A1 | 12/2002 | Nagao et al. | |
| 2003/0218602 A1* | 11/2003 | Naito | H04N 5/74 345/204 |
| 2004/0212787 A1* | 10/2004 | Kida | G03B 21/18 353/94 |
| 2004/0239887 A1* | 12/2004 | Yasuda | H04N 5/74 353/57 |
| 2005/0219430 A1* | 10/2005 | Nagano | H04N 5/165 349/9 |
| 2005/0220156 A1 | 10/2005 | Kitabayashi | |
| 2005/0242741 A1* | 11/2005 | Shiota | H04N 9/31 315/112 |
| 2006/0082964 A1* | 4/2006 | Taniguchi | G03B 21/16 361/679.21 |
| 2006/0120084 A1* | 6/2006 | Sueoka | G03B 21/16 362/294 |
| 2007/0051057 A1 | 3/2007 | Zakoji et al. | |
| 2008/0030689 A1* | 2/2008 | Hsu | G03B 21/16 353/57 |
| 2008/0297053 A1* | 12/2008 | Yun | G03B 21/2013 315/88 |
| 2009/0058839 A1* | 3/2009 | Naito | H04N 9/3144 345/204 |
| 2009/0086169 A1 | 4/2009 | Nakamura | |
| 2010/0132379 A1 | 6/2010 | Wu et al. | |
| 2010/0171935 A1 | 7/2010 | Yamagishi et al. | |
| 2011/0025987 A1* | 2/2011 | Furumi | G03B 21/16 353/57 |
| 2011/0037954 A1* | 2/2011 | Tsuchiya | G03B 21/16 353/54 |
| 2011/0234984 A1 | 9/2011 | Egawa et al. | |
| 2011/0242499 A1 | 10/2011 | Terao | |
| 2012/0229710 A1* | 9/2012 | Okazawa | H04N 9/3155 348/748 |
| 2013/0107223 A1* | 5/2013 | Toyooka | G03B 21/2033 353/31 |
| 2013/0128457 A1* | 5/2013 | Shioya | G02F 1/133385 361/695 |
| 2013/0128458 A1* | 5/2013 | Shioya | G02F 1/133385 361/695 |
| 2013/0148085 A1* | 6/2013 | Sakamoto | G03B 21/16 353/52 |
| 2013/0271736 A1* | 10/2013 | Terashima | G03B 21/2053 353/57 |
| 2014/0218693 A1* | 8/2014 | Kubo | H04N 9/3188 353/57 |
| 2015/0009218 A1* | 1/2015 | Fukutomi | H04N 9/3188 345/428 |
| 2015/0010338 A1 | 1/2015 | Miyagawa et al. | |
| 2015/0029469 A1* | 1/2015 | Kubo | G03B 21/16 353/57 |
| 2016/0105652 A1* | 4/2016 | Yamashita | H04N 9/3144 348/333.1 |
| 2017/0214892 A1 | 7/2017 | Nagatani | |
| 2017/0374326 A1 | 12/2017 | Aikoh | |
| 2018/0239227 A1* | 8/2018 | Suzuki | G03B 21/2026 |
| 2019/0005893 A1* | 1/2019 | Naitou | G03B 21/2053 |
| 2019/0196311 A1 | 6/2019 | Sugiyama et al. | |
| 2019/0196312 A1 | 6/2019 | Sugiyama et al. | |
| 2019/0196313 A1 | 6/2019 | Okada et al. | |
| 2019/0271906 A1 | 9/2019 | Okada et al. | |

FOREIGN PATENT DOCUMENTS

| | | |
|---|---|---|
| JP | H11-169644 A | 6/1999 |
| JP | 2002-107698 A | 4/2002 |
| JP | 2002-326012 A | 11/2002 |
| JP | 2002-372748 A | 12/2002 |
| JP | 2004-109731 A | 4/2004 |
| JP | 2007-240646 A | 9/2007 |
| JP | 2007-294655 A | 11/2007 |
| JP | 2009-086271 A | 4/2009 |
| JP | 2010-107751 A | 5/2010 |
| JP | 2011-012820 A | 1/2011 |
| JP | 2011-036768 A | 2/2011 |
| JP | 2011-215457 A | 10/2011 |
| JP | 2014-087797 A | 5/2014 |
| JP | 2018-097312 A | 6/2018 |
| JP | 2019-117332 A | 7/2019 |

OTHER PUBLICATIONS

U.S. Appl. No. 16/894,060, filed Jun. 5, 2020 in the name of Sugiyama.
Oct. 6, 2021 Notice of Allowance issued in U.S. Appl. No. 16/894,060.

* cited by examiner

PROJECTOR HAVING COOLER

The present application is based on, and claims priority from JP Application Serial Number 2019-109548, filed Jun. 12, 2019, the disclosure of which is hereby incorporated by reference herein in its entirety.

BACKGROUND

1. Technical Field

The present disclosure relates to a projector.

2. Related Art

As a unit that cools a projector, there have been proposed cooling units, for example, an air-based cooling unit shown in JP-A-2002-107698 using an air blower and a liquid-based cooling unit shown in JP-A-2007-294655 using a pump that delivers a refrigerant liquid and a pipe through which the refrigerant liquid passes.

In recent years, an increase in luminance of light outputted from a projector and other factors increase the amount of heat generated by a cooling target to be cooled by a cooling unit, and the cooling performance of the cooling unit is required to be improved. To improve the cooling performance of the cooling unit described above based, for example, on air or liquid, however, there are problems of an increase in the size of the cooling unit and in turn an increase in the size of the projector. Further, in the case of the air-based cooling, there is also a problem of an increase in noise produced by the air blower.

SUMMARY

An aspect of a projector according to the present disclosure is directed to a projector including a cooling target, the projector including a light source configured to emit light, a light modulator configured to modulate the light emitted from the light source in accordance with an image signal, a projection optical apparatus configured to project the light modulated by the light modulator, a cooler configured to cool the cooling target based on transformation of a refrigerant into a gas, and a controller configured to control at least one of the cooler and the light source. The cooler includes a refrigerant generator configured to generate the refrigerant, a refrigerant sender configured to send the generated refrigerant toward the cooling target, and a cooling air blower configured to deliver air to the cooling target. The controller is configured to perform a first control and a second control, the first and second controls which control at least one of the cooling air blower and the light source. The controller performs one of the first control and the second control based on information on activation of the projector from a time of the activation of the projector. In the second control, the controller performs at least one of a luminance control and an output control, the luminance control which reduces luminance of the light outputted from the light source in the second control to a value smaller than the luminance of the light outputted from the light source in the first control, and the output control which increases output of the cooling air blower in the second control to a value larger than the output of the cooling air blower in the first control.

The controller may perform both the luminance control and the output control in the second control.

When performing the second control from the time of the activation of the projector, the controller may terminate the second control and then perform the first control.

When performing the second control from the time of the activation of the projector and a period for which the second control was performed is longer than or equal to a predetermined period, the controller may terminate the second control.

The projector may further include a temperature sensor configured to measure a temperature of the cooling target. When performing the second control from the time of the activation of the projector, the controller may terminate the second control based on the temperature of the cooling target provided from the temperature sensor.

When performing the second control from the time of the activation of the projector and the temperature of the cooling target provided from the temperature sensor starts lowering at a rate of change greater than or equal to a predetermined value, the controller may terminate the second control.

During the first control, the controller may terminate the first control based on the temperature of the cooling target provided from the temperature sensor and perform the second control.

During the first control, the controller may terminate the first control when the temperature of the cooling target provided from the temperature sensor is higher than or equal to a predetermined value and, perform the second control.

The information on the activation of the projector may include a number of the activation of the projector, and when the projector is activated for the first time, the controller may perform the second control from the time of the activation of the projector.

The information on the activation of the projector may include a length of an off period for which the projector was powered off, and when the length of the off period is longer than or equal to a predetermined length, the controller may perform the second control from the time of the activation of the projector.

The predetermined length may be at least one week.

When the second control is performed from the time of the activation of the projector, an execution period of time for which the second control was performed may be longer than or equal to a period of a startup time of the projector.

When the second control is performed from the time of the activation of the projector, the execution period may be longer than or equal to 5 minutes but shorter than or equal to 20 minutes.

The cooling target may be the light modulator.

DESCRIPTION OF EXEMPLARY EMBODIMENTS

A projector according to an embodiment of the present disclosure will be described below with reference to the drawings. The scope of the present disclosure is not limited to the following embodiment and can be arbitrarily changed within the scope of the technical idea of the present disclosure. In the following drawings, for clarity of each configuration, the scale, the number, and other factors of the structure of the configuration differ from the scale, the number, and the other factors of the actual structure of the configuration in some cases.

Figure 1:
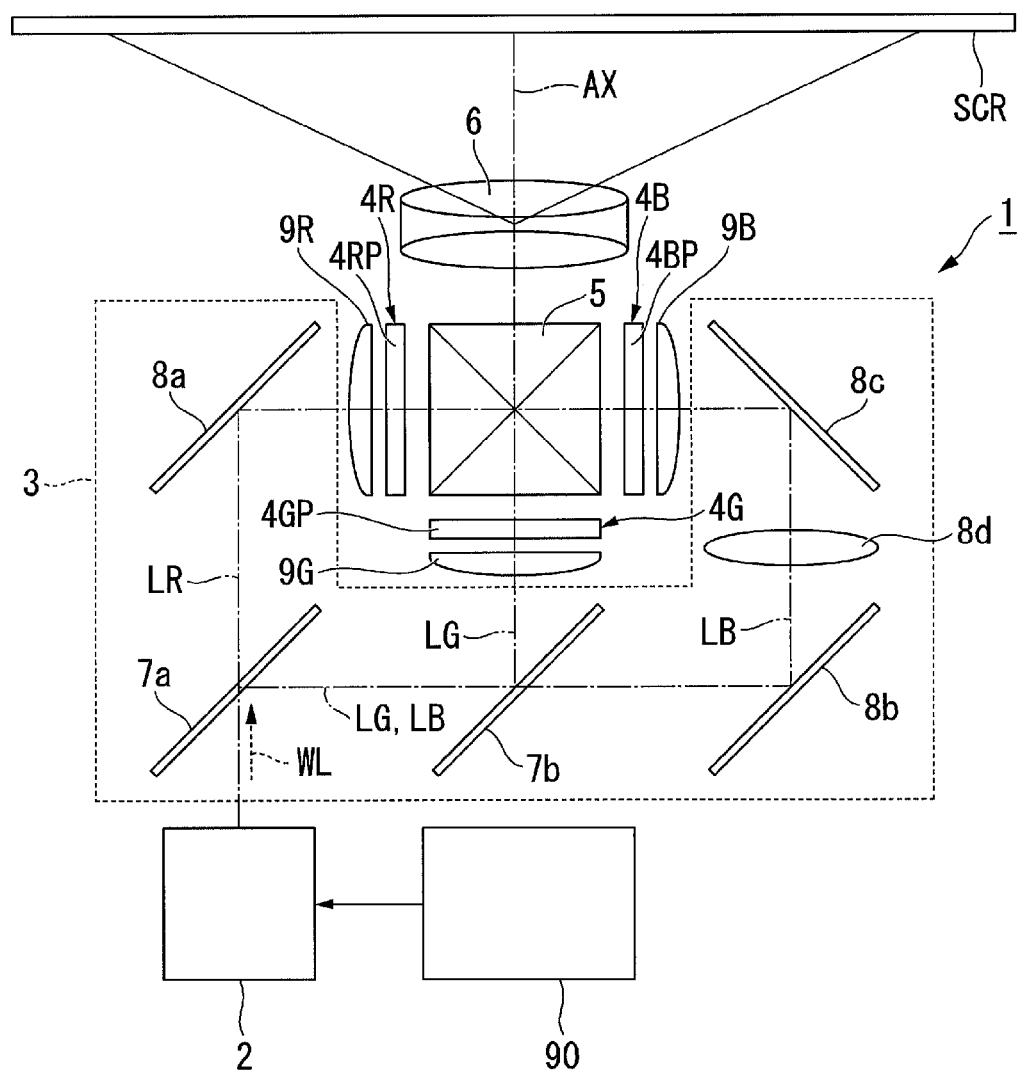
FIG. 1 is a schematic configuration diagram showing a projector according to an embodiment of the present disclosure.
Figure 2:
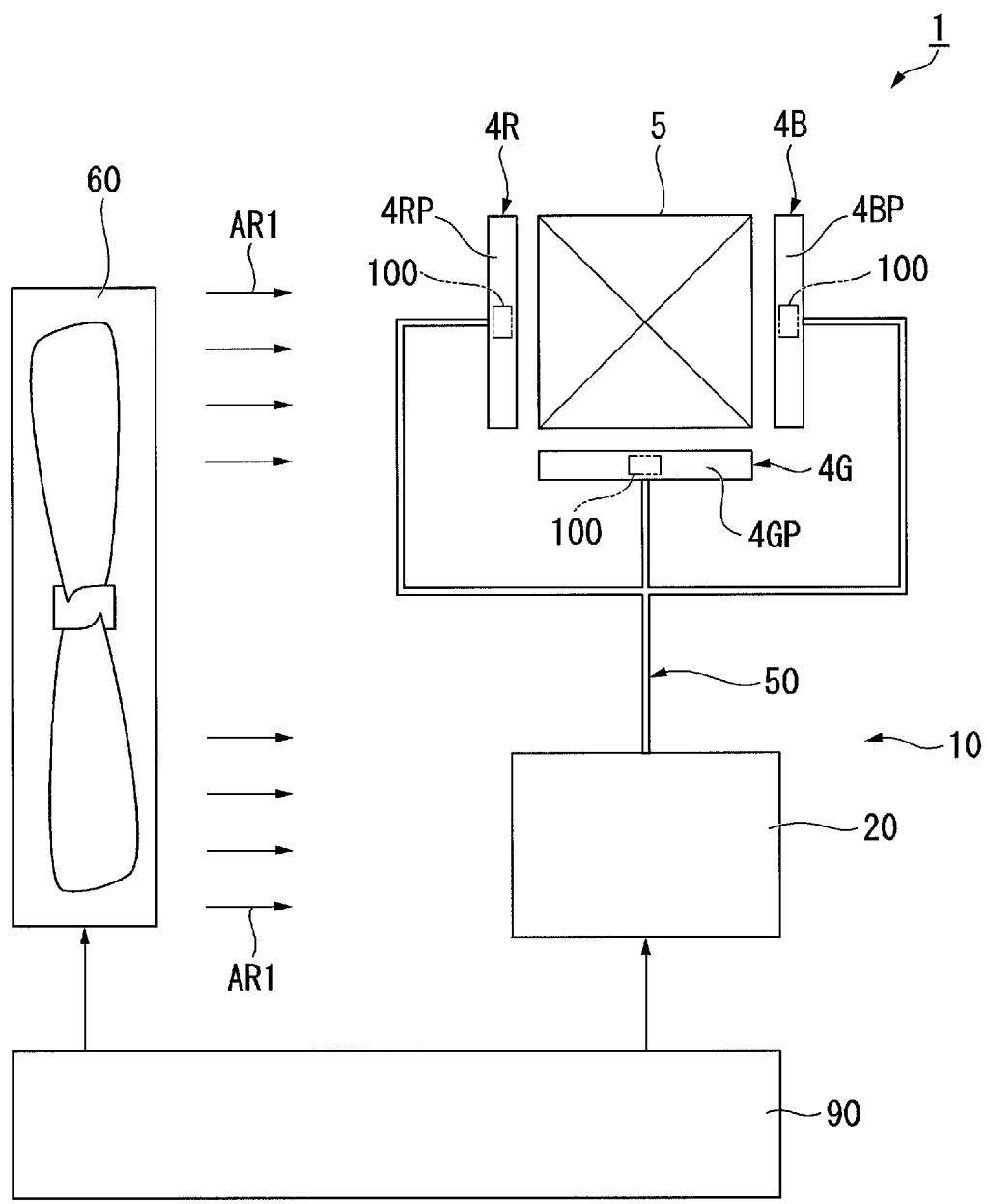
FIG. 2 is a diagrammatic view showing part of the projector according to the present embodiment.

FIG. 1 is a schematic configuration diagram showing a projector 1 according to the present embodiment. FIG. 2 is a diagrammatic view showing part of the projector 1 according to the present embodiment. The projector 1 includes a light source apparatus 2, a color separation system 3, a light modulation unit 4R, a light modulation unit 4G, a light modulation unit 4B, a light combining system 5, and a projection optical apparatus 6, as shown in FIG. 1. The light modulation unit 4R includes a light modulator 4RP. The light modulation unit 4G includes a light modulator 4GP. The light modulation unit 4B includes a light modulator 4BP.

The light source apparatus 2 outputs illumination light WL, which is so adjusted to have a substantially uniform illuminance distribution, toward the color separation system 3. The light source apparatus 2 includes, for example, a semiconductor laser as a light source. The color separation system 3 separates the illumination light WL from the light source apparatus 2 into red light LR, green light LG, and blue light LB. The color separation system 3 includes a first dichroic mirror 7a, a second dichroic mirror 7b, a first reflection mirror 8a, a second reflection mirror 8b, a third reflection mirror 8c, and a relay lens 8d.

The first dichroic mirror 7a separates the illumination light WL outputted from the light source apparatus 2 into the red light LR and light containing the green light LG and the blue light LB mixed with each other. The first dichroic mirror 7a is so characterized as to transmit the red light LR and reflect the green light LG and the blue light LB. The second dichroic mirror 7b separates the light containing the green light LG and the blue light LB mixed with each other into the green light LG and the blue light LB. The second dichroic mirror 7b is so characterized as to reflect the green light LG and transmit the blue light LB.

The first reflection mirror 8a is disposed in the optical path of the red light LR and reflects the red light LR having passed through the first dichroic mirror 7a toward the light modulator 4RP. The second reflection mirror 8b and the third reflection mirror 8c are disposed in the optical path of the blue light LB and guide the blue light LB having passed through the second dichroic mirror 7b to the light modulator 4BP.

The light modulators 4RP, 4GP, and 4BP are each formed of a liquid crystal panel. The light modulator 4RP modulates the red light LR out of the light outputted from the light source apparatus 2 in accordance with an image signal. The light modulator 4GP modulates the green light LG out of the light outputted from the light source apparatus 2 in accordance with an image signal. The light modulator 4BP modulates the blue light LB out of the light outputted from the light source apparatus 2 in accordance with an image signal. The light modulators 4RP, 4GP, and 4BP thus form image light fluxes corresponding to the respective color light fluxes. Although not shown, polarizers are disposed on the light incident side and the light exiting side of each of the light modulators 4RP, 4GP, and 4BP.

A field lens 9R, which parallelizes the red light LR to be incident on the light modulator 4RP, is disposed on the light incident side of the light modulator 4RP. A field lens 9G, which parallelizes the green light LG to be incident on the light modulator 4GP, is disposed on the light incident side of the light modulator 4GP. A field lens 9B, which parallelizes the blue light LB to be incident on the light modulator 4BP, is disposed on the light incident side of the light modulator 4BP.

The light combining system 5 is formed of a cross dichroic prism having a substantially cubic shape. The light combining system 5 combines the color image light fluxes from the light modulators 4RP, 4GP, and 4BP with one another. The light combining system 5 outputs the combined image light toward the projection optical apparatus 6. The projection optical apparatus 6 is formed of a projection lens group. The projection optical apparatus 6 enlarges the combined image light from the light combining system 5, that is, the light fluxes modulated by the light modulators 4RP, 4GP, and 4BP and projects the enlarged image light, that is, the enlarged modulated light fluxes toward a screen SCR. An enlarged color image (video) is thus displayed on the screen SCR.

The projector 1 further includes a cooler 10, as shown in FIG. 2. The cooler 10, in which a refrigerant W is transformed into a gas, cools a cooling target provided in the projector 1. In the present embodiment, the refrigerant W is, for example, liquid water. In the following description, the transformation of the refrigerant W into a gas is therefore simply called vaporization in some cases. In the present embodiment, the cooling target includes the light modulation units 4R, 4G, and 4B. That is, in the present embodiment, the cooling target includes the light modulators 4RP, 4GP, and 4BP.

The cooler 10 includes a refrigerant generator 20 and a refrigerant sender 50. The refrigerant generator 20 is a portion that generates the refrigerant W. The refrigerant sender 50 is a portion that sends the generated refrigerant W toward the cooling target. The refrigerant W delivered by the refrigerant sender 50 to the cooling target, that is, the light modulation units 4R, 4G, and 4B in the present embodiment vaporizes so as to be capable of drawing heat from the cooling target. The cooler 10 can thus cool the cooling target. The refrigerant generator 20 and the refrigerant sender 50 will be described below in detail.

Figure 3:
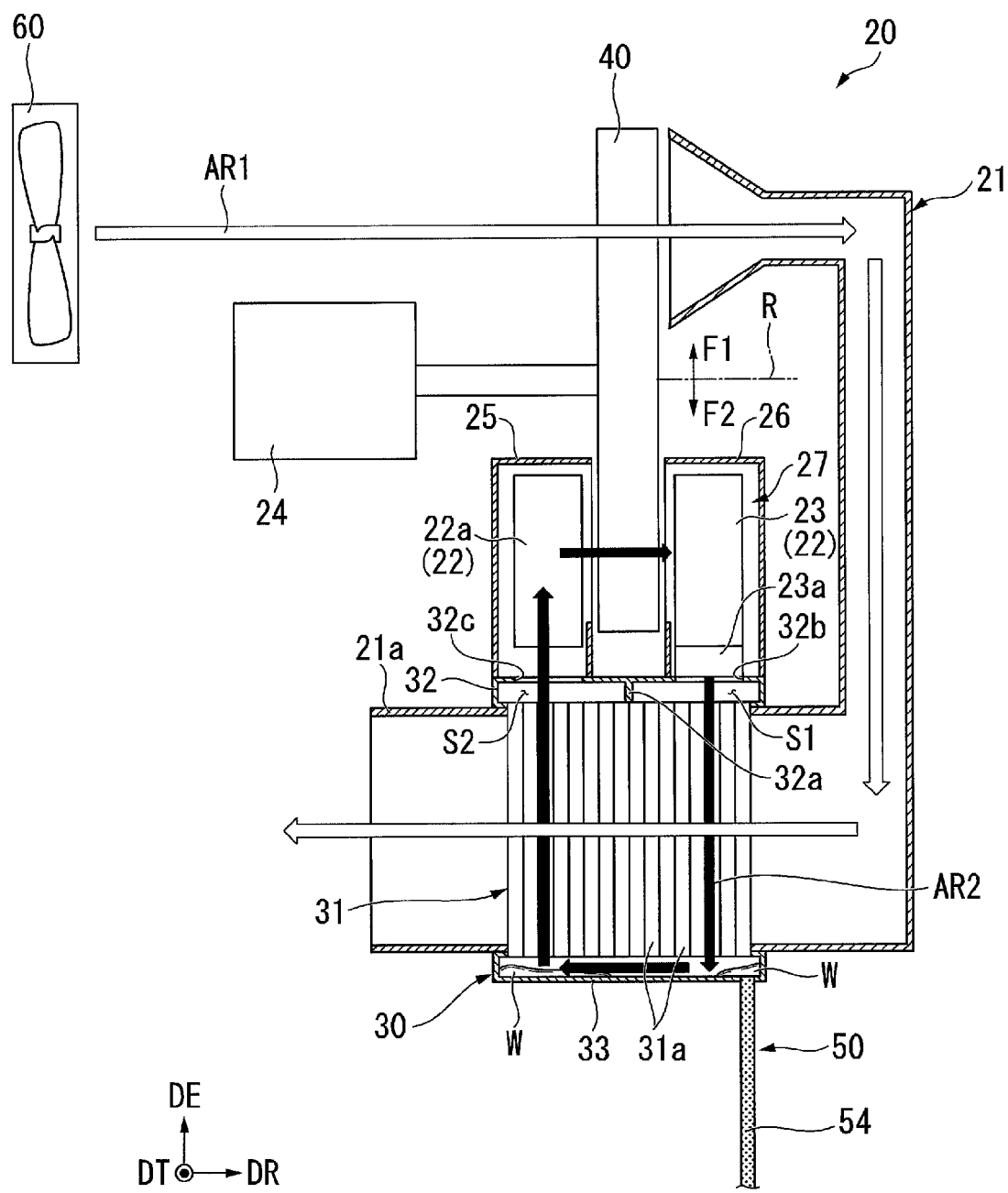
FIG. 3 is a schematic configuration diagram diagrammatically showing a refrigerant generator in the present embodiment.

FIG. 3 is a schematic configuration diagram diagrammatically showing the refrigerant generator 20 in the present embodiment. The refrigerant generator 20 includes a moisture absorbing/discharging member 40, a motor (driver) 24, a first air blower (cooling air blower) 60, a heat exchanger 30, a circulation duct 25, a circulation duct 26, a heater 22, a second air blower 23, and a cooling duct 21, as shown in FIG. 3.

Figure 4:
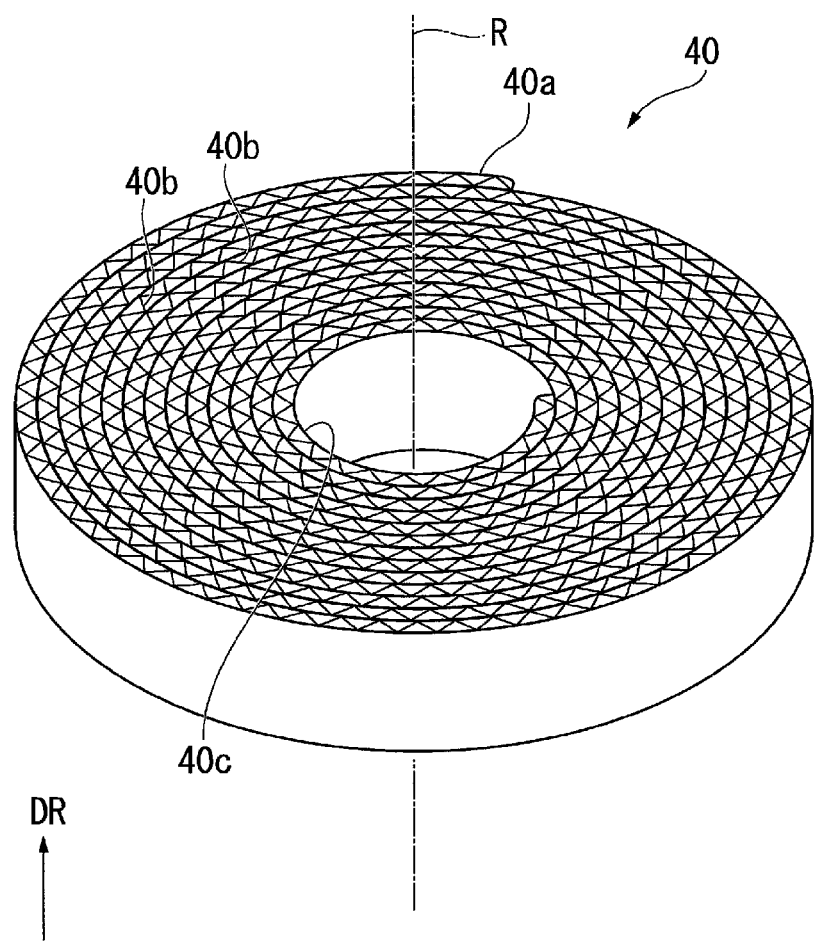
FIG. 4 is a perspective view showing a moisture absorbing/discharging member in the present embodiment.

FIG. 4 is a perspective view showing the moisture absorbing/discharging member 40. The moisture absorbing/discharging member 40 has a flat cylindrical shape around an axis of rotation R, as shown in FIG. 4. A central hole 40c around the axis of rotation R is formed at the center of the moisture absorbing/discharging member 40. The central hole 40c passes through the moisture absorbing/discharging member 40 in the axial direction of the axis of rotation R. The moisture absorbing/discharging member 40 rotates around the axis of rotation R. In the following description, the axial direction of the axis of rotation R is called a "rotational axis direction DR" and drawn as appropriate in the form of an axis DR in the drawings.

The moisture absorbing/discharging member 40 has an innumerable number of through holes 40b, which pass through the moisture absorbing/discharging member 40 in the rotational axis direction DR. The moisture absorbing/discharging member 40 is a porous member. The moisture absorbing/discharging member 40 absorbs and discharges moisture. In the present embodiment, the moisture absorbing/discharging member 40 is formed, for example, by winding a band-shaped member 40a having the through holes 40b around the axis of rotation R and applying a substance that absorbs and discharges moisture onto a surface of the wound band-shaped member 40a that is the surface exposed to the ambient environment. A surface of the wound band-shaped member 40a that is the surface exposed to the ambient environment includes the outer surface of the moisture absorbing/discharging member 40, the inner circumferential surface of the central hole 40c, and the inner surface of each of the through holes 40b. The moisture absorbing/discharging member 40 may instead be entirely made of a substance that absorbs and discharges moisture. Examples of the substance that absorbs and discharges moisture may include zeolite and silica gel.

The output shaft of the motor 24 shown in FIG. 3 is inserted into the central hole 40c of the moisture absorbing/discharging member 40 and fixed thereto. The motor 24 rotates the moisture absorbing/discharging member 40 around the axis of rotation R. The rotational speed of the moisture absorbing/discharging member 40 rotated by the motor 24 is, for example, approximately greater than or equal to 0.2 rpm but smaller than or equal to 5 rpm.

The first air blower 60 is, for example, an intake fan that takes outside air into the projector 1. The first air blower 60 delivers air AR1 to a portion of the moisture absorbing/discharging member 40 that is the portion located in a first region F1. The first region F1 is a region on one side of the axis of rotation R in the direction perpendicular to the axis of rotation R. On the other hand, the region on the other side of the axis of rotation R in the direction perpendicular to the axis of rotation R, that is, the region opposite the first region F1 with respect to the axis of rotation R is a second region F2. The first region F1 is a region above the axis of rotation R in FIG. 3. The second region F2 is a region below the axis of rotation R in FIG. 3.

The first air blower 60 delivers the air AR1 also to the light modulation units 4R, 4G, and 4B, which form the cooling target, as shown in FIG. 2. That is, in the present embodiment, the first air blower 60 is a cooling air blower that delivers the air AR1 to the cooling target. The first air blower 60 is not limited to a specific apparatus and may be any apparatus capable of delivering the air AR1, for example, an axial fan and a centrifugal fan.

Figure 5:
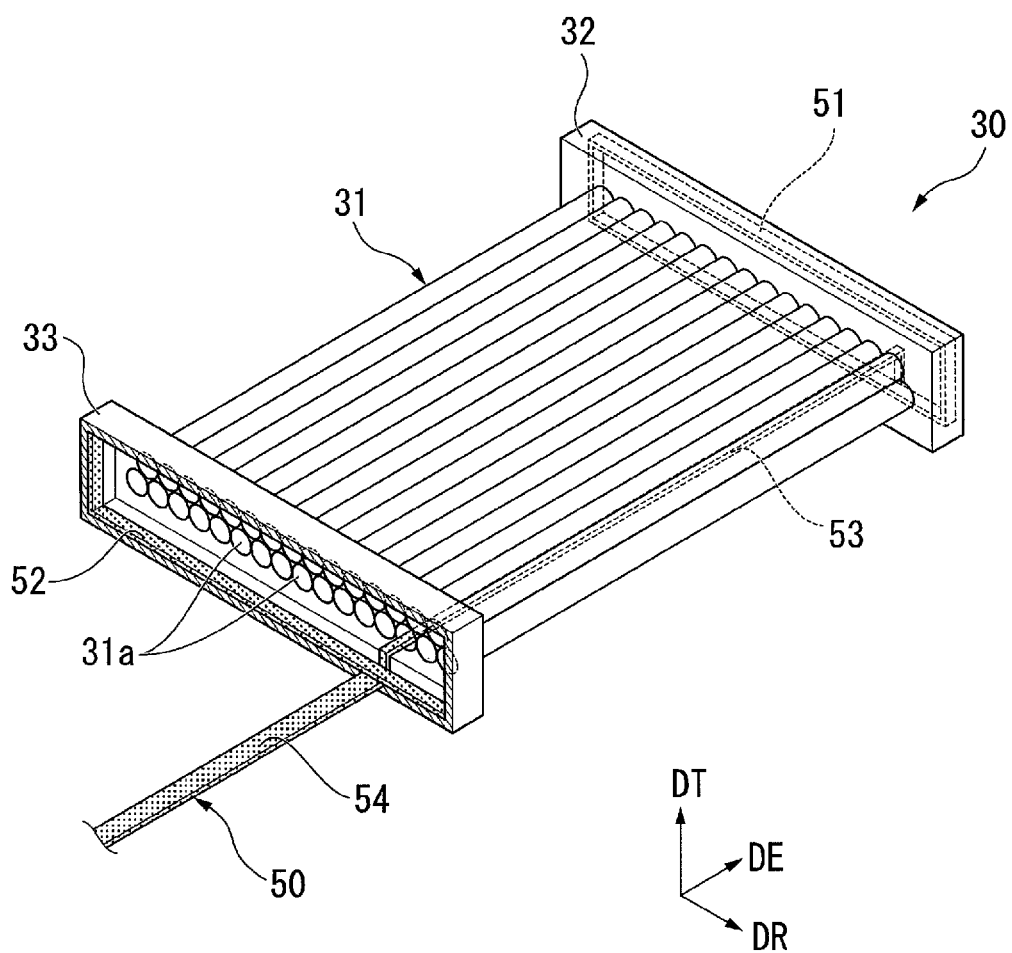
FIG. 5 is a partial cross-sectional perspective view showing a heat exchanger in the present embodiment.

The heat exchanger 30 is a portion that generates the refrigerant W. FIG. 5 is a partial cross-sectional perspective view showing the heat exchanger 30. The heat exchanger 30 includes a flow channel 31, a first lid 32, and a second lid 33, as shown in FIG. 5.

The flow channel 31 includes a plurality of tubular pipes 31a extending in one direction. In the present embodiment, the one direction in which the pipes 31a extend is, for example, perpendicular to the rotational axis direction DR. The pipes 31a are each open at the opposite ends thereof in the one direction in which the pipe 31a extends. The pipes 31a each have, for example, a circular cross-sectional shape perpendicular to the one direction in which the pipe 31a extends. In the following description, the one direction in which the pipes 31a extend is called an "extension direction DE" and drawn as appropriate in the form of an axis DE in the drawings. The first region F1 and the second region F2 described above are separate with respect to the axis of rotation R from each other in the extension direction DE perpendicular to the rotational axis direction DR.

In the present embodiment, the flow channel 31 is formed by layering a plurality of layers, which are each formed of a plurality of pipes 31a arranged in the rotational axis direction DR, on each other in the direction perpendicular both to the rotational axis direction DR and the extension direction DE. In the following description, the direction perpendicular both to the rotational axis direction DR and the extension direction DE is called a "thickness direction DT" and drawn as appropriate in the form of an axis DT in the drawings. In the present embodiment, the dimension of the flow channel 31 in the thickness direction DT is, for example, smaller than the dimension of the flow channel 31 in the rotational axis direction DR or is the smallest of the dimensions of the flow channel 31 in the directions perpendicular to the extension direction DE.

The first lid 32 is coupled to an end of the flow channel 31 that is the end on one side in the extension direction DE (+DE side). The first lid 32 has the shape of a rectangular parallelepiped box elongated in the rotational axis direction DR. One end of each of the pipes 31a in the extension direction DE is open in the first lid 32. A partition 32a is provided in the first lid 32, as shown in FIG. 3. The partition 32a partitions the interior of the first lid 32 into a first space S1 and a second space S2 disposed side by side in the rotational axis direction DR. In FIG. 3, the first space S1 is located on the right of the second space S2 (+DR side).

A communication hole 32b, which allows the first space S1 to be continuous with the interior of the circulation duct 26, is formed in the first lid 32. A communication hole 32c, which allows the second space S2 to be continuous with the interior of the circulation duct 25, is formed in the first lid 32.

The second lid 33 is coupled to an end of the flow channel 31 that is the end on the other side in the extension direction DE (−DE side), that is, the end opposite the end to which the first lid 32 is coupled to the flow channel 31. The second lid 33 has the shape of a rectangular parallelepiped box elongated in the rotational axis direction DR, as shown in FIG. 5. The other end of each of the pipes 31a in the extension direction DE is open in the second lid 33. The interior of the second lid 33 is not partitioned, unlike in the first lid 32. The interior of the second lid 33 is continuous with the first space S1 and the second space S2 in the first lid 32 via the interior of the pipes 31a of the flow channel 31. The second lid 33 is coupled to the refrigerant sender 50. The heat exchanger 30 is thus coupled to the refrigerant sender 50. In FIG. 5, a wall of the second lid 33 that is the wall located on the other side in the extension direction DE is omitted.

The circulation duct 26 is a duct disposed on one side of the moisture absorbing/discharging member 40 in the rotational axis direction DR (+DR side), as shown in FIG. 3. The circulation duct 26 has an inlet that is located on the other side in the rotational axis direction DR (−DR side) and is open toward a portion of the moisture absorbing/discharging member 40 that is the portion located in the second region F2. The circulation duct 26 has an outlet continuous with the communication hole 32b in the first lid 32.

The circulation duct 25 is a duct disposed on the other side of the moisture absorbing/discharging member 40 in the rotational axis direction DR (−DR side). The circulation duct 25 has an outlet that is located on the one side in the rotational axis direction DR (+DR side) and is open toward a portion of the moisture absorbing/discharging member 40 that is the portion located in the second region F2. The circulation duct 25 has an inlet continuous with the communication hole 32c in the first lid 32.

The heater 22 includes a heating main body 22a. The heating main body 22a is disposed in the circulation duct 25. The heating main body 22a is disposed on the other side, in the rotational axis direction DR (−DR side), of a portion of the moisture absorbing/discharging member 40 that is the portion located in the second region F2. The heating main body 22a is, for example, an electric heater. The heating main body 22a heats the atmosphere (air) in the circulation duct 25. In the present embodiment, the heater 22 includes the second air blower 23.

The second air blower 23 is disposed in the circulation duct 26. The second air blower 23 is disposed on the one side, in the rotational axis direction DR (+DR side), of a portion of the moisture absorbing/discharging member 40 that is the portion located in the second region F2. The second air blower 23 is, for example, a centrifugal fan. The second air blower 23 discharges air sucked from the other side in the rotational axis direction DR (−DR side) via an exhaust port 23a toward the other side in the extension direction DE (−DE side). The exhaust port 23a is open toward the communication hole 32b in the first lid 32. The second air blower 23 delivers the air into the first space S1 via the communication hole 32b.

The air discharged from the second air blower 23 into the first space S1 is the air having been sucked from the other side of the second air blower 23 in the rotational axis direction DR (−DR side) via the inlet of the circulation duct 26 and having passed through a portion of the moisture absorbing/discharging member 40 that is the portion located in the second region F2. That is, the second air blower 23 causes the air to pass through a portion of the moisture absorbing/discharging member 40 that is the portion located in the second region F2, which differs from the first region F1, and delivers the air to the heat exchanger 30. In the present embodiment, the air before passing through a portion of the moisture absorbing/discharging member 40 that is the portion located in the second region F2 has flowed through the interior of the circulation duct 25. The heating main body 22a therefore heats the air before passing through a portion of the moisture absorbing/discharging member 40 that is the portion located in the second region F2.

As described above, in the present embodiment, the heater 22 heats a portion of the moisture absorbing/discharging member 40 that is the portion located in the second region F2 with the aid of the second air blower 23, which delivers the air heated by the heating main body 22a to a portion of the moisture absorbing/discharging member 40 that is the portion located in the second region F2. The second air blower 23 thus delivers air that passes through a portion of the moisture absorbing/discharging member 40 that is the portion heated by the heater 22 and air around the heated portion to the heat exchanger 30.

The air having flowed from the second air blower 23 into the heat exchanger 30 via the first space S1 passes through the pipes 31a continuous with the first space S1 out of the plurality of pipes 31a and flows into the second lid 33. The air having flowed into the second lid 33 passes through the pipes 31a continuous with the second space S2 out of the plurality of pipes 31a, flows into the second space S2, and flows into the circulation duct 25 via the communication hole 32c. The air having flowed into the circulation duct 25 is heated by the heating main body 22a, passes through a portion of the moisture absorbing/discharging member 40 that is the portion located in the second region F2 again, flows into the circulation duct 26, and is sucked by the second air blower 23.

As described above, in the present embodiment, the refrigerant generator 20 has a circulation path 27, through which the air discharged from the second air blower 23 circulates. The circulation path 27 is formed of at least the circulation ducts 25 and 26 and the heat exchanger 30. The circulation path 27 passes through the heating main body 22a, the moisture absorbing/discharging member 40, and the heat exchanger 30. The circulation path 27 is substantially sealed although small gaps are provided between the moisture absorbing/discharging member 40 and the circulation ducts 25, 26, and entry of air outside the circulation path 27 into the circulation path 27 is therefore suppressed. In the following description, the air discharged from the second air blower 23 and circulating through the circulation path 27 is called air AR2.

The cooling duct 21 is a duct having an inlet disposed on the one side, in the rotational axis direction DR (+DR side), of a portion of the moisture absorbing/discharging member 40 that is the portion located in the first region F1. Air flowing into the cooling duct 21 is the air AR1 having been discharged from the first air blower 60 and having passed through a portion of the moisture absorbing/discharging member 40 that is the portion located in the first region F1. The cooling duct 21 extends from a region on the one side of a portion of the moisture absorbing/discharging member 40 that is the portion located in the first region F1 toward the heat exchanger 30.

The cooling duct 21 includes a cooling passage 21a, which extends in the rotational axis direction DR. The flow channel 31 of the heat exchanger 30 is so disposed in the cooling passage 21a as to pass thereacross in the extension direction DE. The flow channel 31 is thus disposed in the cooling passage 21a. The air AR1 passing through the cooling passage 21a is sprayed onto the outer surface of the flow channel 31 and passes by the flow channel 31 in the rotational axis direction DR. The flow channel 31 is thus cooled by the air AR1. That is, the heat exchanger 30 is cooled by the air AR1 having been discharged from the first air blower 60 and having passed through the moisture absorbing/discharging member 40. In FIG. 3, the air AR1 in the cooling passage 21a passes by the flow channel 31 from right to left. The cooling passage 21a has an open end facing the other side in the rotational axis direction DR (−DR side). The opening of the cooling passage 21a is, for example, an outlet of the cooling duct 21.

When the air AR1 is delivered from the first air blower 60 to a portion of the moisture absorbing/discharging member 40 that is the portion located in the first region F1, water vapor contained in the air AR1 is absorbed by a portion of the moisture absorbing/discharging member 40 that is the portion located in the first region F1. A portion of the moisture absorbing/discharging member 40 that is the portion having absorbed the water vapor moves from the first region F1 to the second region F2 when the motor 24 rotates the moisture absorbing/discharging member 40. The air AR2 heated by the heating main body 22a and therefore having a relatively high temperature then passes through a portion of the moisture absorbing/discharging member 40 that is the portion located in the second region F2. The moisture absorbed by the moisture absorbing/discharging member 40 thus vaporizes and is discharged into the air AR2.

The air AR2 having passed through the moisture absorbing/discharging member 40 and therefore containing the water vapor absorbed from the air AR1 is delivered by the second air blower 23 to the heat exchanger 30. The air AR2 having flowed via the first space S1 into the heat exchanger 30 flows through the flow channel 31. In more detail, the air AR2 flows through part of the pipes 31a of the flow channel 31. The flow channel 31 is externally cooled by the air AR1 flowing along the rotational axis direction DR through the cooling passage 21a of the cooling duct 21.

When the flow channel 31 is cooled, the air AR2 flowing through part of the pipes 31a and having a relatively high temperature is cooled, so that the water vapor contained in the air AR2 condenses into liquid water, that is, the refrigerant W. The heat exchanger 30, when cooled, thus generates the refrigerant W from the air AR2 having flowed into the heat exchanger 30.

In the present embodiment, the refrigerant sender 50 is formed of a porous member and sends the refrigerant W based on capillarity. Examples of the material of the refrigerant sender 50 may include polypropylene, cotton, and porous metal. The material of the refrigerant sender 50 preferably allows the refrigerant sender 50 to provide relatively large surface tension. The refrigerant sender 50 includes a first catcher 51, a second catcher 52, a third catcher 53, and a connector 54, as shown in FIG. 5.

The first catcher 51 is fixed to an edge portion of an inner surface of the first lid 32 that is the inner surface facing the one side in the extension direction DE (+DE side). The first catcher 51 has a thin-band-like shape and is formed in a rectangular-frame-like shape extending along the edge portion of the first lid 32. The second catcher 52 is fixed to an edge portion of an inner surface of the second lid 33 that is the inner surface facing the other side in the extension direction DE (−DE side). The second catcher 52 has a thin-band-like shape and is formed in a rectangular-frame-like shape extending along the edge portion of the second lid 33.

The third catcher 53 extends from the first catcher 51, passes through a pipe 31a, and reaches the second catcher 52, so that the third catcher 53 couples the first catcher 51 to the second catcher 52. The third catcher 53 has a thin-band-like shape extending in the extension direction DE. In the present embodiment, the third catcher 53 is disposed in one of the plurality of pipes 31a, as shown in FIG. 5, but not necessarily. The third catcher 53 may be provided in each of part of the plurality of pipes 31a or may be provided in each of the plurality of pipes 31a. When the third catcher 53 is provided in each of part of the plurality of pipes 31a, the third catchers 53 may be provided in two or more pipes 31a.

Figure 6:
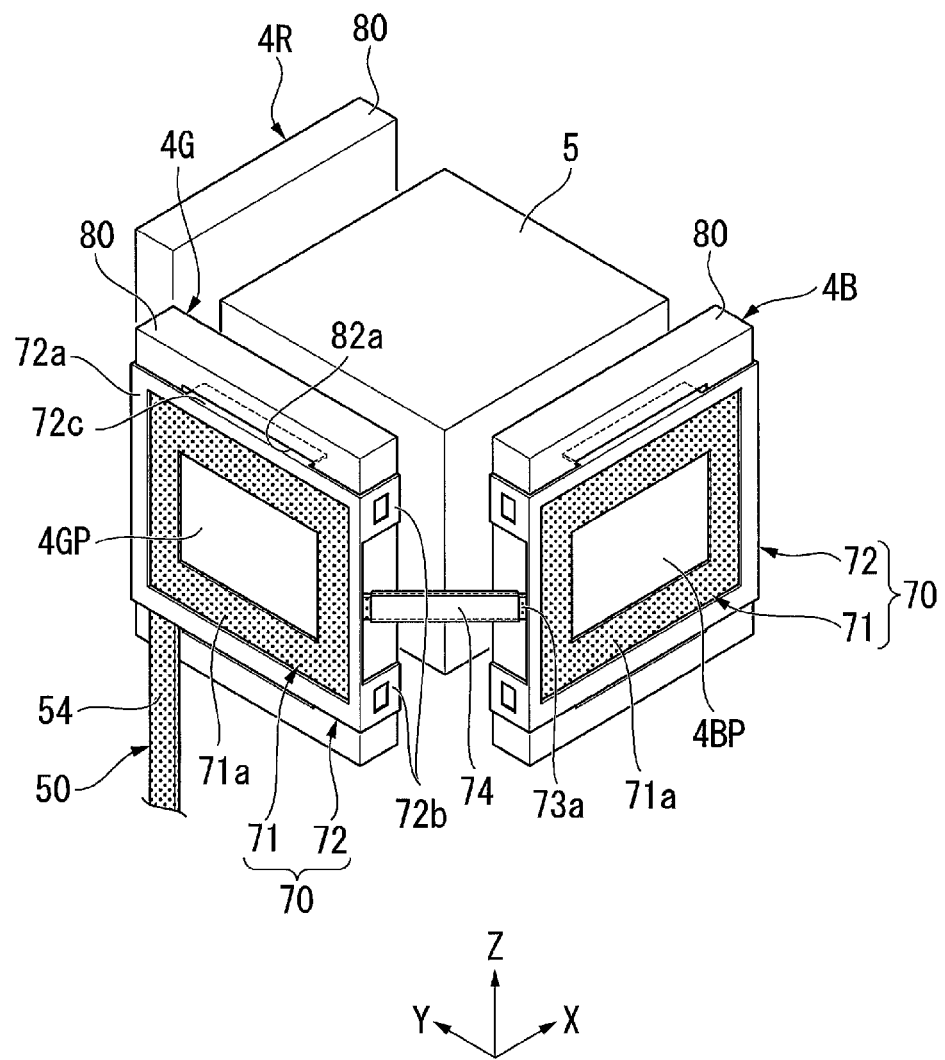
FIG. 6 is a perspective view showing light modulation units and a light combining system in the present embodiment.

The connector 54 is a portion that couples the refrigerant generator 20 to the cooling target. In the present embodiment, the connector 54 is coupled to the second catcher 52, extends from the interior of the second lid 33, passes through the wall of the second lid 32, and protrudes out of the second lid 33. The connector 54, which protrudes out of the second lid 33, extends to the light modulation unit 4G, which is part of the cooling target, as shown in FIG. 6. FIG. 6 is a perspective view showing the light modulation units 4R, 4G, and 4B and the light combining system 5. The connector 54 has a thin-band-like shape. The width of the connector 54 is, for example, greater than the width of the first catcher 51, the width of the second catcher 52, and the width of the third catcher 53.

The light modulation units 4R, 4G, and 4B, which form the cooling target in the present embodiment, will next be described in more detail. In the following description, an upward/downward direction Z, with the upper side thereof being the positive side and the lower side thereof being the negative side, is drawn as appropriate in the form of an axis Z in the drawings. The direction parallel to an optical axis AX of a projection lens of the projection optical apparatus 6 that is the projection lens closest to the light exiting side, that is, the direction parallel to the projection direction of the projection optical apparatus 6 is called an "optical axis direction X" and drawn as appropriate in the form of an axis X in the drawings. The optical axis direction X is perpendicular to the upward/downward direction Z. The direction perpendicular both to the optical axis direction X and the upward/downward direction Z is called a "width direction Y" and drawn as appropriate in the form of an axis Y in the drawings.

The upward/downward direction Z and the upper and lower sides thereof are merely names for describing the relative positional relationship among the portions of the projector, and the actual arrangement and other factors of the portions may differ from the arrangement and other factors indicated by the names.

Figure 7:
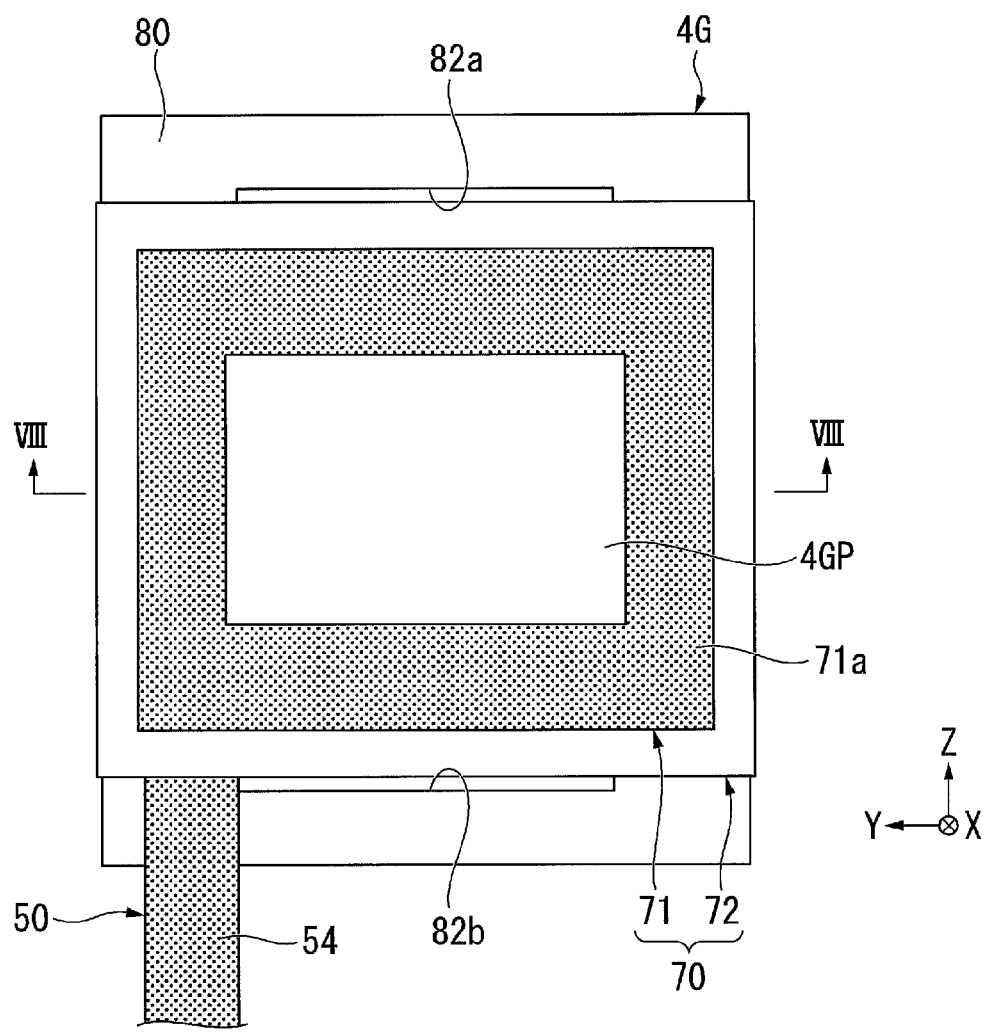
FIG. 7 shows one of the light modulation units in the present embodiment viewed from the light incident side.
Figure 8:
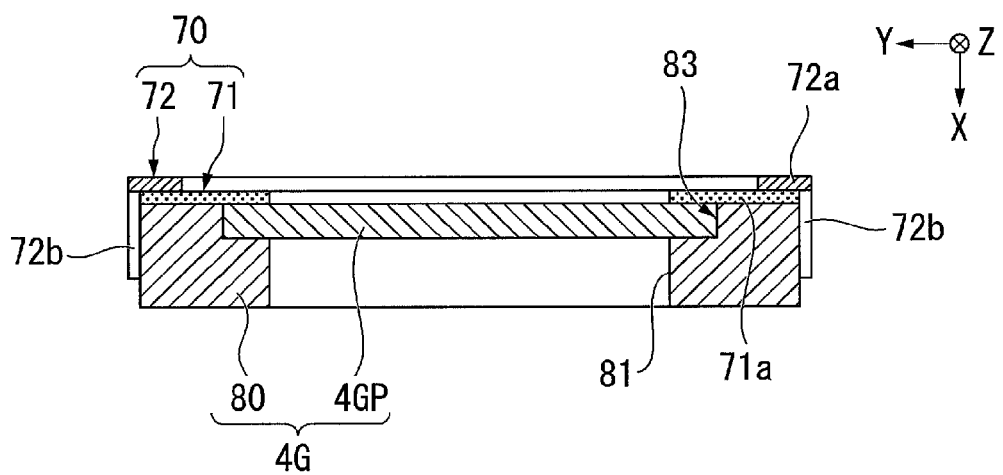
FIG. 8 is a cross-sectional view of the one light modulation unit in the present embodiment taken along the line VIII-VIII in FIG. 7.

FIG. 7 shows the light modulation unit 4G viewed from the light incident side. FIG. 8 is a cross-sectional view of the light modulation unit 4G taken along the line VIII-VIII in FIG. 7.

The light modulation units 4R, 4G, and 4B, which form the cooling target, are so disposed as to surround the light combining system 5, as shown in FIG. 6. The light modulation units 4R and 4B are so disposed on the opposite sides of the light combining system 5 as to sandwich the light combining system 5 in the width direction Y. The light modulation unit 4G is disposed on the light incident side of the light combining system 5 in the optical axis direction X (−X side). The light modulation units 4R, 4G, and 4B have the same structure except that they are disposed in different positions and take different attitudes, and only the light modulation unit 4G will therefore be representatively described below in some cases.

The light modulation unit 4G includes a holding frame 80, which holds the light modulator 4GP. The holding frame 80 has the shape of a substantially rectangular parallelepiped that is flat in the direction in which the light is incident on the light modulator 4GP and elongated in the upward/downward direction Z, as shown in FIGS. 6 to 8. The direction in which the light is incident on the light modulator 4GP is, for example, the optical axis direction X.

The holding frame 80 has a through hole 81, which passes through the holding frame 80 in the light incident direction, as shown in FIG. 8. A stepped part 83, where the width of the through hole 81 increases, is provided along an edge of the through hole 81 that is the edge on the light incident side (−X side). The light modulator 4GP is so held by the holding frame 80 as to be fit into the stepped part 83. Insertion grooves 82a and 82b are formed in portions of the lightincident-side surface of the holding frame 80 that are portions on the opposite sides of the holding frame 80 in the upward/downward direction Z, as shown in FIG. 7.

The projector 1 further includes a cooling facilitator 70 provided in the light modulation unit 4G, which is part of the cooling target, as shown in FIGS. 6 to 8. The cooling facilitator 70 includes a refrigerant holder 71 and a fixing member 72. The refrigerant holder 71 is attached to a surface of the holding frame 80, which holds the light modulation unit 4G, which is part of the cooling target. In the present embodiment, the refrigerant holder 71 is provided on a surface of the holding frame 80 that is the surface facing the light incident side of the light modulator 4GP (−X side). The refrigerant holder 71 is formed of a porous member that holds the refrigerant W. Examples of the material of the refrigerant holder 71 may include polypropylene, cotton, and porous metal. The material of the refrigerant holder 71 can, for example, be the same material of the refrigerant sender 50. The material of the refrigerant holder 71 preferably allows the refrigerant holder 71 to provide relatively large surface tension.

Figure 9:
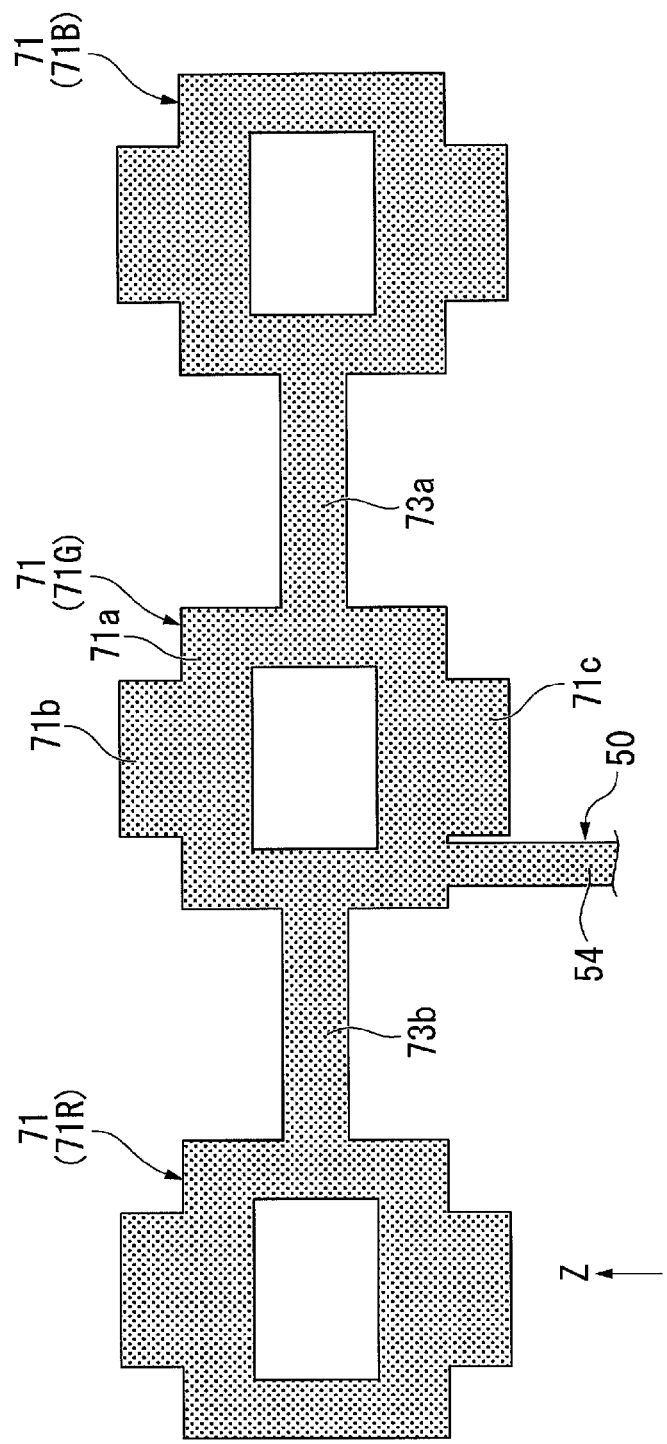
FIG. 9 shows refrigerant holders in the present embodiment.

FIG. 9 shows the refrigerant holder 71. The refrigerant holder 71 includes a main body 71a, which has a rectangular-frame-like shape, and inserted parts 71b and 71c, which are provided at the opposite ends of the main body 71a that are the opposite ends in the upward/downward direction Z, as shown in FIG. 9. The main body 71a covers part of a surface of the holding frame 80 that is the surface facing the light incident side of the light modulator 4GP (−X side), as shown in FIG. 8. An inner edge portion of the main body 71a covers an outer edge portion of the light modulator 4GP. The inserted part 71b is bent and inserted into the insertion groove 82a of the holding frame 80. The inserted part 71c is bent and inserted into the insertion groove 82b of the holding frame 80.

The fixing member 72 is a member that fixes the refrigerant holder 71. The fixing member 72 is a plate-shaped member as shown in FIGS. 6 and 8. The fixing member 72 is made, for example, of metal. The fixing member 72 includes a frame part 72a, which has a rectangular-frame-like shape, attachment parts 72b, and inserted parts 72c. The frame part 72a covers an outer edge portion of the refrigerant holder 71, as shown in FIGS. 7 and 8. The holding frame 80, the refrigerant holder 71, and the frame part 72a are layered on each other in the direction in which the light passes through the light modulator unit 4G (optical axis direction X). In the following description, the direction in which the holding frame 80, the refrigerant holder 71, and the frame part 72a are layered on each other is simply called a "layering direction." The fixing member 72 fixes the refrigerant holder 71 in such a way that the frame part 72a and the holding frame 80 sandwich the refrigerant holder 71 in the layering direction (optical axis direction X).

The inner edge of the frame part 72a is so provided as to be shifted outward from the inner edge of the refrigerant holder 71. A portion of the refrigerant holder 71, that is, the portion inside the frame part 72a in the present embodiment is exposed when viewed along the layering direction from the side facing the fixing member 72.

The attachment parts 72b are provided at four end portions of the frame part 72a, opposite end portions in the upward/downward direction Z and opposite end portions in the width direction Y, as shown in FIGS. 6 and 8. The attachment parts 72b protrude from the frame part 72a toward the holding frame 80 (+X side). The attachment parts 72b engage with protrusions so provided as to protrude from the side surface of the holding frame 80. The fixing member 72 is thus fixed to the holding frame 80.

The inserted parts 72c are provided at the opposite ends of the frame part 72a in the upward/downward direction Z. The inserted parts 72c protrude from the frame part 72a toward the holding frame 80 (+X side). The inserted parts 72c are inserted into the insertion grooves 82a and 82b of the holding frame 80. The inserted parts 72c press the inserted parts 71b and 71c of the refrigerant holder 71 in the insertion grooves 82a and 82b.

The cooling facilitator 70 is provided in each of the plurality of light modulation units 4R, 4G, and 4B. That is, the refrigerant holder 71 and the fixing member 72 are provided in each of the plurality of light modulation units 4R, 4G, and 4B. A refrigerant holder 71G provided in the light modulation unit 4G out of the light modulation units 4R, 4G, and 4B is coupled to the refrigerant sender 50, as shown in FIG. 9. In more detail, the connector 54 of the refrigerant sender 50 is coupled to the lower end of the refrigerant holder 71G.

A refrigerant holder 71B attached to the light modulation unit 4B and a refrigerant holder 71R attached to the light modulation unit 4R are the same as the refrigerant holder 71G attached to the light modulation unit 4G except that the connector 54 is not coupled to the refrigerant holder 71B or the refrigerant holder 71R.

In the present embodiment, linkage parts 73a and 73b, which are each formed of a porous member, are provided and link the refrigerant holders 71, which are provided in the plurality of light modulation units 4R, 4G, and 4B, to each other. In the present embodiment, the refrigerant holder 71B attached to the light modulation unit 4B and the refrigerant holder 71R attached to the light modulation unit 4R are linked to the opposite sides of the refrigerant holder 71G, which is attached to the light modulation unit 4G, via the linkage parts 73a and 73b, respectively.

The linkage part 73a links the refrigerant holder 71G attached to the light modulation unit 4G to the refrigerant holder 71B attached to the light modulation unit 4B. The refrigerant holder 71B is thus coupled to the connector 54 of the refrigerant sender 50 via the refrigerant holder 71G. The linkage part 73a is provided with a coating 74, with which the linkage part 73a is coated, as shown in FIG. 6. The coating 74 is, for example, a film made of resin.

The linkage part 73b links the refrigerant holder 71G attached to the light modulation unit 4G to the refrigerant holder 71R attached to the light modulation unit 4R. The refrigerant holder 71R is thus coupled to the connector 54 of the refrigerant sender 50 via the refrigerant holder 71G. Although not shown, the linkage part 73b is similarly provided with a coating 74, as is the linkage part 73a.

The refrigerant W generated by the refrigerant generator 20 is sent to the refrigerant holder 71G via the connector 54 of the refrigerant sender 50. The refrigerant W sent to the refrigerant holder 71G is sent to the refrigerant holder 71B via the linkage part 73a and to the refrigerant holder 71R via the linkage part 73b. The refrigerant W generated by the refrigerant generator 20 is thus sent to the three light modulation units 4R, 4G, and 4B. The refrigerant W sent to and held by the refrigerant holders 71 then vaporizes to cool the light modulation units 4R, 4G, and 4B, which form the cooling target. In more detail, the refrigerant W held by the refrigerant holders 71 vaporizes to cool the holding frames 80, to which the refrigerant holders 71 are attached, so that the light modulators 4RP, 4GP, and 4BP held by the holding frames 80 are cooled. The cooler 10 can thus cool the light modulators 4RP, 4GP, and 4BP, which form the cooling target.

The projector 1 further includes a controller 90, which controls at least one of the cooler 10 and the light source apparatus 2, as shown in FIGS. 1 and 2. In the present embodiment, the controller 90 controls both the cooler 10 and the light source apparatus 2. The controller 90 can perform first control C1 and second control C2, which control at least one of the first air blower 60, which is the cooling air blower, and the light source apparatus 2. In the present embodiment, the controller 90 controls both the first air blower 60 and the light source apparatus 2 in the first control C1 and the second control C2.

The first control C1 is performed when each portion of the projector 1 normally operates. In the present embodiment, the controller 90 performs the first control C1 during the entire period for which the projector 1 is in action except when information on the activation of the projector 1 satisfies a predetermined condition. That is, the first control C1 corresponds to a normal action of the projector 1.

The second control C2 is performed in place of the first control C1 for a certain period from the time of the activation of the projector 1 when the information on the activation of the projector 1 satisfies a predetermined condition. That is, based on the information on the activation of the projector 1, the controller 90 performs one of the first control C1 and the second control C2 from the time of the activation of the projector 1.

In the present embodiment, the information on the activation of the projector 1 includes the number representing how many times the projector 1 was activated and the length of the period for which the projector 1 has been powered off. The information on the activation of the projector 1 may further include information on the environment outside the projector 1 at the time of activation of the projector 1 and a variety of parameters associated with each portion of the projector 1 at the time of the activation of the projector 1.

In the present embodiment, when the projector 1 is activated for the first time, or when the length of the period for which the projector 1 has been powered off is longer than or equal to a predetermined length, the controller 90 performs the second control C2 from the time of the activation of the projector 1. That is, in the present embodiment, the predetermined condition that causes the projector 1 to perform the second control C2 in place of the first control C1 includes the fact that the projector 1 is activated for the first time and the fact that the projector 1 is activated again after the projector 1 has been powered off for a period longer than or equal to the predetermined length.

In the present embodiment, whether the projector 1 is activated for the first time can be detected, for example, from the fact that the cumulative period for which the light source apparatus 2 has emitted light is zero. In the present embodiment, the length of the period for which the projector 1 has been powered off is obtained, for example, by using an radio wave timepiece or any other device provided in the projector 1 to calculate the difference between the time/date when the projector was powered off last time and the time/date when the projector 1 was powered on this time. The predetermined length is, for example, at least one week.

When the projector 1 is activated for the first time, the refrigerant generator 20 has not generated any refrigerant W. Therefore, immediately after the projector 1 is activated for the first time, no refrigerant W is sent to the cooling target. When the length of the period for which the projector 1 has been powered off is longer than or equal to the predetermined length, the refrigerant W that was not used in the period for which the projector 1 is in action and left in the projector 1 is likely to vaporize and disappear. The refrigerant W is therefore unlikely to be sent to the cooling target immediately after the projector 1 is activated again after the projector 1 has been powered off at least for the predetermined length of time.

As described above, the predetermined condition that causes the second control C2 to be performed in place of the first control C1 at the time of activation of the projector 1 of the present embodiment is a condition that does not allow the cooler 10 to immediately deliver or makes it difficult for the cooler 10 to deliver the refrigerant W to the cooling target at the time of the activation of the projector 1. Therefore, during the period for which the second control C2 is performed, for example, no refrigerant W is delivered to the cooling target, so that the cooling target is not cooled based on the vaporization of the refrigerant W. On the other hand, during the period for which the first control C1 is performed, the cooler 10 delivers the refrigerant W to the cooling target, so that the cooling target is cooled when the refrigerant W vaporizes.

Irrespective of the control being performed, the first control C1 or the second control C2, the air AR1 from the first air blower 60 is delivered to the cooling target. In the first control C1, the air AR1 delivered from the first air blower 60 facilitates the vaporization of the refrigerant W and directly cools the cooling target. On the other hand, in the second control C2, only the air AR1 from the first air blower 60 cools the cooling target.

In the second control C2, the controller 90 performs at least one of luminance control LC, which controls the luminance of the light outputted from the light source apparatus 2 (illumination light WL), and output control OC, which controls the output Vf to the first air blower 60. In the present embodiment, the controller 90 performs both the luminance control LC and the output control OC in the second control C2.

Figure 10:
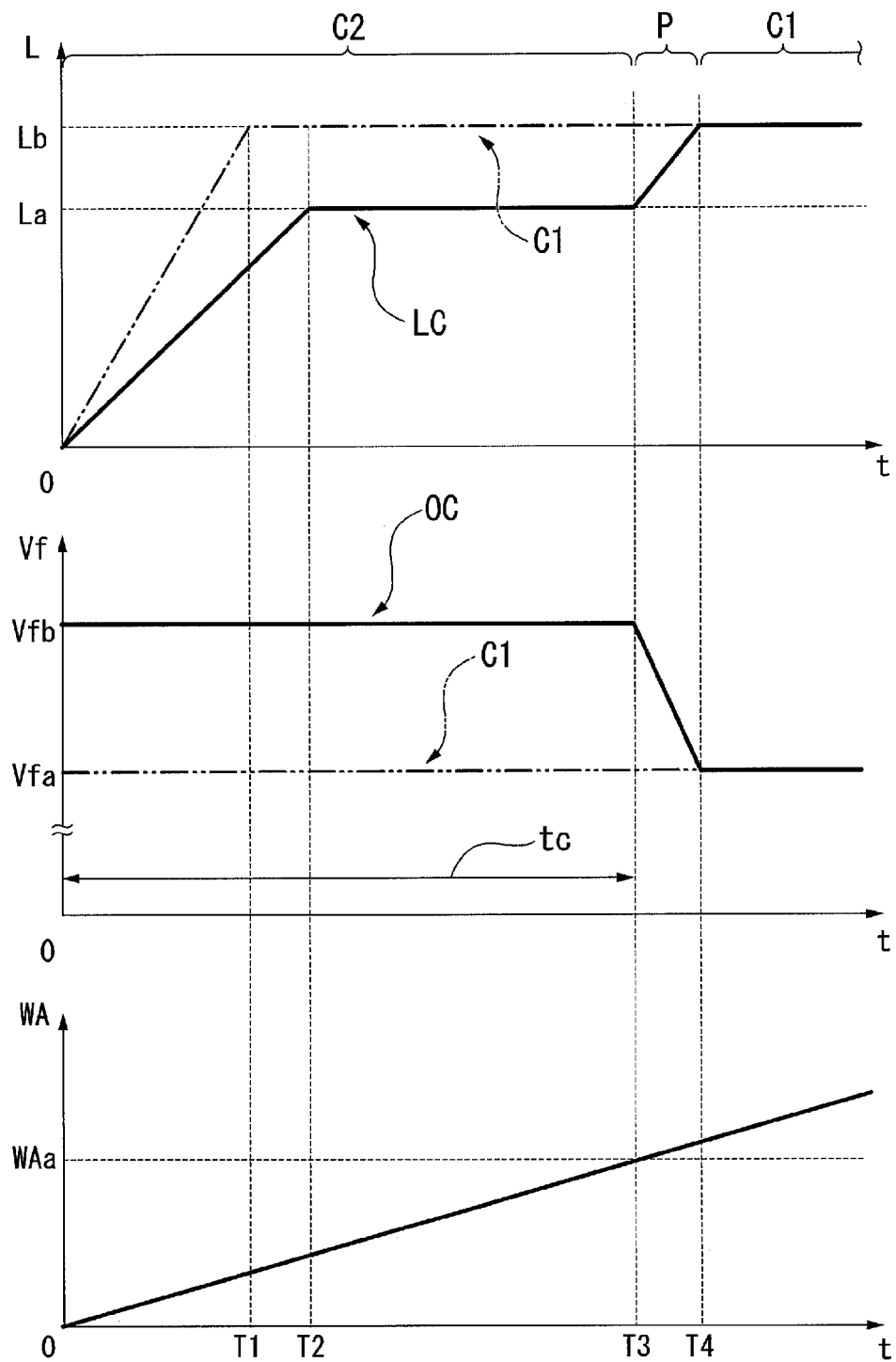
FIG. 10 shows graphs illustrating an example of changes in parameters in luminance control and output control in second control in the present embodiment.

FIG. 10 shows graphs illustrating an example of changes in parameters in the luminance control LC and the output control OC in the second control C2. The uppermost graph in FIG. 10 is a graph showing the temporal change in the luminance L of the light outputted from the light source apparatus 2. The middle graph in FIG. 10 is a graph showing the temporal change in the output Vf to the first air blower 60. The lowermost graph in FIG. 10 is a graph showing the temporal change in the amount WA of refrigerant W generated by the refrigerant generator 20. In the case of the graph showing the luminance L out of the graphs in FIG. 10, the vertical axis represents the luminance L, and the horizontal axis represents time t. In the case of the graph showing the output Vf out of the graphs in FIG. 10, the vertical axis represents the output Vf, and the horizontal axis represents the time t. In the case of the graph showing the amount WA of generated refrigerant W out of the graphs in FIG. 10, the vertical axis represents the amount WA of generated refrigerant W, and the horizontal axis represents the time t.

The graphs showing the luminance L and the output Vf out of the graphs in FIG. 10 are drawn in the form of solid lines showing the changes in the luminance L and the output Vf in the second control C2 and in the form of two-dot chain lines showing the changes in the luminance L and the output Vf in the first control C1. The output Vf is voltage applied to the first air blower 60. The graphs in FIG. 10 are each so drawn that the point of time when the time t is zero is the point of time when the projector 1 is activated. The graph showing the amount WA of generated refrigerant W in FIG.

10 is so drawn that the amount WA of generated refrigerant W is zero at the point of time when the projector 1 is activated, that is, the point of time when the time t is zero. FIG. 10 shows a case where the amount WA of generated refrigerant W linearly increases with the time t.

The luminance control LC in the second control C2 is so performed that the luminance L of the light outputted from the light source apparatus 2 in the second control C2 is smaller than the luminance L of the light outputted from the light source apparatus 2 in the first control C1, as shown in FIG. 10. In the luminance control LC in the example shown in FIG. 10, the luminance L linearly increases to a value La in the period from the activation of the projector 1 to time T2 and then remains at the value La after the time T2. On the other hand, in the first control C1, the luminance L linearly increases to a value Lb, which is greater than the value La, in the period from the activation of the projector 1 to time T1 and then remains at the value Lb after the time T1, as indicated by the two-dot chain line. The value La of the luminance L in the luminance control LC is, for example, greater than or equal to 50% of the value Lb of the luminance L in the first control C1 but smaller than or equal to 80% thereof.

The gradient of the graph representing the change in the luminance L rising to the value La in the luminance control LC is smaller than the gradient of the graph representing the change in the luminance L rising to the value Lb in the first control C1. The luminance L in the luminance control LC is therefore smaller than the luminance L in the first control C1 also during the period for which the luminance L at the activation of the projector 1 rises to the value La. The time T2, at which the luminance L reaches the value La in the luminance control LC, may coincide with or differ from the time T1, at which the luminance L reaches the value Lb in the first control C1. In FIG. 10, for example, the time T2 is behind the time T1.

The output control OC in the second control C2 is so performed that the output Vf to the first air blower 60 in the second control C2 is greater than the output Vf to the first air blower 60 in the first control C1. In the output control OC in the example shown in FIG. 10, the output Vf is maintained at a value Vfb, which is greater than a value Vfa, at which the output Vf is maintained in the first control C1. The value Vfb of the output Vf in the output control OC is, for example, greater than or equal to 110% of the value Vfa of the output Vf in the first control C1 but smaller than or equal to 150% thereof.

Figure 11:
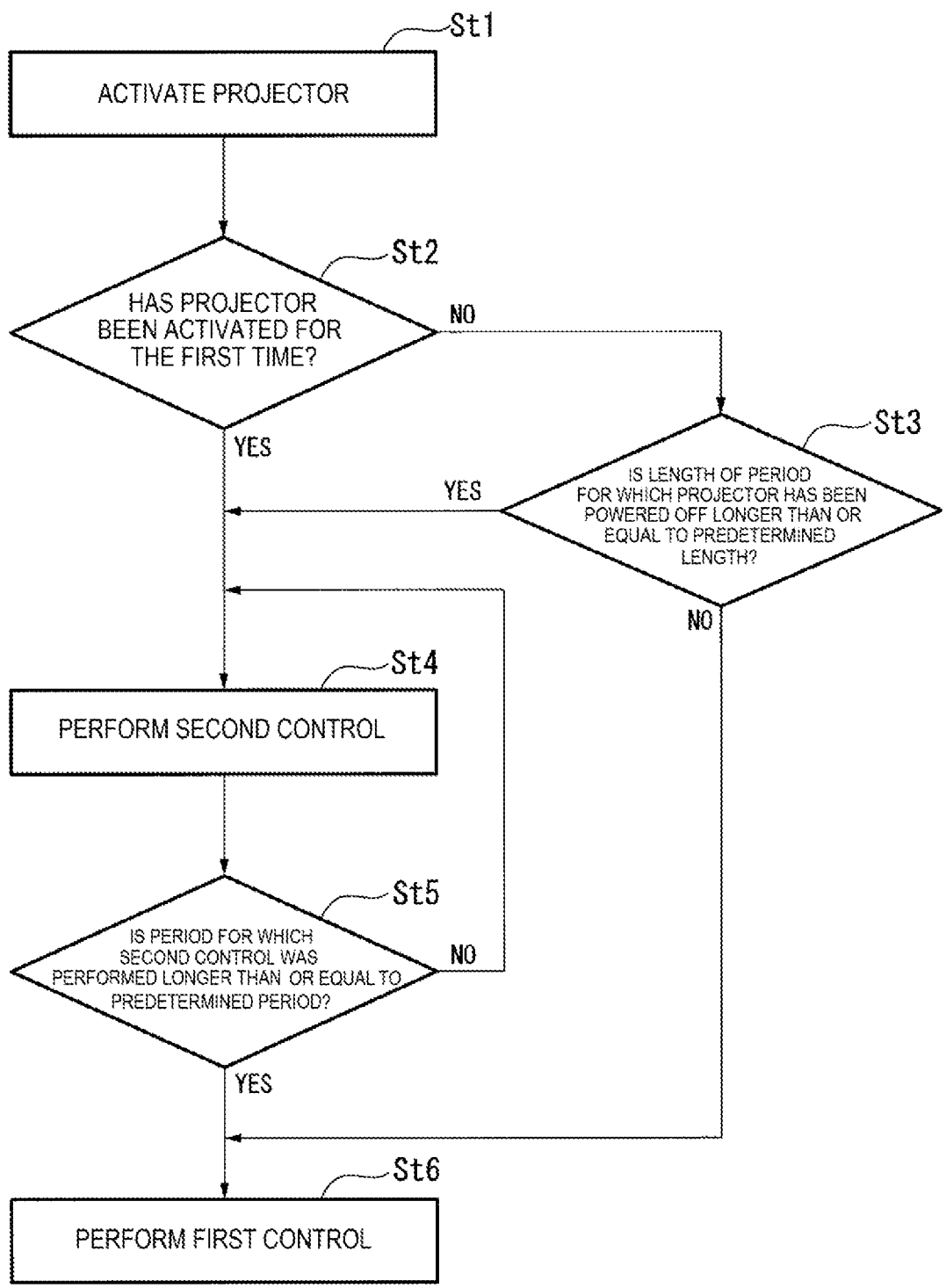
FIG. 11 is a flowchart showing an example of the procedure of control performed by a controller in the present embodiment.

An example of the procedure of the control performed by the controller 90 will next be described. FIG. 11 is a flowchart showing an example of the procedure of the control performed by the controller 90 in the present embodiment.

When the projector 1 is activated (step St1), the controller 90 evaluates whether or not the projector 1 is activated for the first time (step St2), as shown in FIG. 11. When the projector 1 is activated for the first time (YES in step St2), the controller 90 performs the second control C2 from the time of the activation of the projector 1 (step St4).

On the other hand, when the projector 1 is activated second time or later (NO in step St2), the controller 90 evaluates whether or not the length of the period for which the projector 1 has been powered off is longer than or equal to the predetermined length (step St3). When the length of the period for which the projector 1 has been powered off is longer than or equal to the predetermined length (YES in step St3), the controller 90 performs the second control C2 from the time of the activation of the projector 1 (step St4).

On the other hand, when the length of the period for which the projector 1 has been powered off is shorter than the predetermined length (NO in step St3), the controller 90 performs the first control C1 from the time of the activation of the projector 1 (step St6).

When the controller 90 performs the second control C2 from the time of the activation of the projector 1 (step St4), the controller 90 evaluates whether or not a period tc for which the second control C2 has been performed is longer than or equal to a predetermined period (step St5). The predetermined period is, for example, longer than or equal to 5 minutes (min) but shorter than or equal to 20 minutes (min). When the period tc for which the second control C2 has been performed is shorter than the predetermined period (NO in step St5), the controller 90 keeps performing the second control C2. On the other hand, when the period tc for which the second control C2 has been performed is longer than or equal to the predetermined period (YES in step St5), the controller 90 terminates the second control C2 and performs the first control C1 (step St6). That is, in the present embodiment, when performing the second control C2 from the time of the activation of the projector 1, the controller 90 terminates the second control C2 when the period tc for which the second control C2 has been performed is longer than or equal to the predetermined period and performs the first control C1 after the second control C2 is terminated.

Since the second control C2 is terminated as described above, the period tc for which the second control C2 is performed in the present embodiment is, for example, longer than or equal to 5 minutes (min) but shorter than or equal to 20 minutes (min), as is the predetermined period. That is, in FIG. 10, the period tc for which the second control C2 is performed is the period from the activation of the projector 1 to time T3. The period tc for which the second control C2 is performed is longer than the period in which the projector 1 starts. The period in which the projector 1 starts is the period from the time at which the projector 1 is activated to the time at which a color image (video) is ready to be projected. When the light source of the light source apparatus 2 is a semiconductor laser, the period in which the projector 1 starts is, for example, about 10 seconds (s). When the light source of the light source apparatus 2 is a discharge lamp, the period in which the projector 1 starts is, for example, about 1 minute (min).

In the example shown in FIG. 10, the controller 90 terminates the second control C2 at the time T3. In the present embodiment, for example, the amount WA of generated refrigerant W reaches a value WAa at the time T3, at which the second control C2 is terminated, and the refrigerant W reaches the cooling target via the refrigerant sender 50. In the present embodiment, after the second control C2 is terminated, the first control C1 starts with a transition period P therebetween. In the transition period P, the luminance L linearly rises from the value La to the value Lb. In the transition period P, the output Vf linearly lowers from the value Vfb to the value Vfa.

In FIG. 10, the luminance L has the value Lb and the output Vf has the value Vfa both at time T4, but not necessarily. The time at which the luminance L has the value Lb may differ from the time at which the output Vf has the value Vfa.

According to the present embodiment, the cooler 10 can cool the cooling target by sending the refrigerant W generated by the refrigerant generator 20 to the cooling target via the refrigerant sender 50 and using vaporization of the refrigerant W, which is an endothermic reaction, to draw heat from the cooling target. The cooling based on the vaporization of the refrigerant W can actively draw heat from the cooling target and therefore provides excellent cooling performance as compared with air cooling and liquid cooling, in which a cooling target is cooled based merely on heat transfer to a refrigerant. Therefore, to provide the same cooling performance as that provided by air cooling or liquid cooling, the overall size of the cooler 10 is readily reduced as compared with the size required by air cooling or liquid cooling.

Further, in the cooling based on the vaporization of the refrigerant W, the cooling performance can be improved by an increase in the surface area where the refrigerant W that vaporizes comes into contact with the cooling target. The increase in the cooling performance of the cooler 10 therefore causes no increase in noise produced by the cooler 10. The present embodiment therefore provides a projector 1 including a cooler 10 that excels in cooling performance, has a compact size, and excels in quietness.

According to the present embodiment, in which the refrigerant generator 20 can generate the refrigerant W, a user's convenience can be improved because the user does not need to replenish the refrigerant W. Further, since the refrigerant generator 20 can perform adjustment in such a way that it generates the refrigerant W by a necessary amount as required, there is no need for storage of the refrigerant W, for example, in a storage tank, whereby the weight of the projector 1 can be reduced.

According to the present embodiment, the moisture absorbing/discharging member 40 can absorb water vapor contained in the air AR1 delivered from the first air blower 60, and the moisture absorbed by the moisture absorbing/discharging member 40 can be discharged in the form of water vapor into the air AR2 delivered by the second air blower 23. The heat exchanger 30 then allows the moisture discharged in the form of water vapor into the air AR2 to condense into the refrigerant W. Therefore, according to the present embodiment, the refrigerant W can be generated from the atmosphere in the projector 1.

According to the present embodiment, the heat exchanger 30 is cooled by the air AR1 having been discharged from the first air blower 60 and having passed through the moisture absorbing/discharging member 40. No cooling section that cools the heat exchanger 30 therefore needs to be separately provided, whereby an increase in the number of parts of the projector 1 can be suppressed. Further, an increase in noise produced by the projector 1 can be suppressed as compared with a case where an air blower is separately provided as the cooling section that cools the heat exchanger 30.

According to the present embodiment, the first air blower 60 is the cooling air blower that delivers the air AR1 to the light modulation units 4R, 4G, and 4B, which form the cooling target. The air AR1 therefore causes the refrigerant W sent to the light modulation units 4R, 4G, and 4B to readily vaporize, whereby the light modulation units 4R, 4G, and 4B can be further cooled. Further, no cooling air blower that cools the cooling target needs to be provided separately from the first air blower 60, whereby an increase in the number of parts of the projector 1 can be suppressed, and an increase in noise produced by the projector 1 can be suppressed.

In the present embodiment, the first air blower 60, which is an intake fan that takes outside air into the projector 1, is used to facilitate the vaporization of the refrigerant W delivered to the cooling target, as described above. The same cooling performance as that provided when no cooler 10 is provided can therefore be provided even when the output of the first air blower 60 is lowered. The noise produced by the first air blower 60 can therefore be reduced by lowering the output of the first air blower 60, which is an intake fan, whereby the quietness of the projector 1 can be further improved.

For example, when the projector is activated for the first time or when the length of the period for which the projector 1 has been powered off is longer than or equal to the predetermined length, no refrigerant W is present in the projector 1, so that the refrigerant W is unlikely to be delivered to the cooling target immediately after the projector 1 is activated, as described above. It therefore takes time to a certain degree to deliver the refrigerant W to the cooling target after the projector is activated. As a result, until the refrigerant W is delivered to the cooling target, the cooling target is cooled only by the air AR1 delivered from the first air blower 60, undesirably resulting in possible insufficient cooling of the cooling target.

In contrast, according to the present embodiment, the controller 90 performs one of the first control C1 and the second control C2 based on the information on the activation of the projector 1 from the time of the activation of the projector 1, and the controller 90 performs at least one of the luminance control LC and the output control OC in the second control C2.

When the luminance control LC is performed, the luminance L of the light outputted from the light source apparatus 2 is lower than the luminance L in the first control C1. The amount of heat generated in the projector 1 therefore decreases, so that the temperature of the cooling target provided in the projector 1 is unlikely to rise as compared with the temperature in the first control C1. As a result, even when no refrigerant W is delivered to the cooling target, performing the luminance control LC in the second control C2 allows suppression of insufficient cooling of the cooling target.

On the other hand, when the output control OC is performed, the output Vf to the first air blower 60, which delivers the air AR1 to the cooling target, is greater than the output Vf in the first control C1. The amount of air AR1 delivered from the first air blower 60 to the cooling target can therefore be increased. The first air blower 60 can cool the cooling target with improved cooling magnitude. As a result, even when no refrigerant W is delivered to the cooling target, performing the output control OC in the second control C2 allows suppression of insufficient cooling of the cooling target.

As described above, when the controller 90 determines based on the information on the activation of the projector 1 that no refrigerant W or almost no refrigerant W is present in the projector 1, the controller 90 can perform the second control C2 from the time of the activation of the projector 1 to suppress insufficient cooling of the cooling target until the refrigerant W is generated and delivered to the cooling target. The reliability of the projector 1 can therefore be improved.

According to the present embodiment, the controller 90 performs both the luminance control LC and the output control OC in the second control C2. Therefore, in the second control C2, the amount of air AR1 delivered from the first air blower 60 to the cooling target can be increased with the amount of heat generated in the projector 1 reduced to suppress a rise in the temperature of the cooling target. As a result, even when no refrigerant W is delivered to the cooling target, insufficient cooling of the cooling target can be further suppressed. The reliability of the projector 1 can therefore be further improved. Further, insufficient cooling of the cooling target can be suppressed by the amount corresponding to the performed luminance control LC even when the degree of increase in the output Vf to the first air blower 60 is reduced in the output control OC. The output Vf to the first air blower 60 can therefore be suppressed to a relatively small value, whereby the noise produced by the projector 1 when the second control C2 is performed can be suppressed.

According to the present embodiment, when performing the second control C2 from the time of the activation of the projector 1, the controller 90 terminates the second control C2 and then performs the first control C1. Therefore, after the refrigerant W is delivered to the cooling target, terminating the second control C2 and performing the first control C1 allows an increase in the luminance L of the light outputted from the light source apparatus 2 and a decrease in the output Vf to the first air blower 60 with the cooling target sufficiently cooled based on the vaporization of the refrigerant W. The brightness of a color image (video) projected from the projector 1 can therefore be increased, whereby the user's convenience can be improved. Further, the electric power supplied to the first air blower 60 can be reduced, whereby the power consumed by the projector 1 can be reduced. Moreover, the noise produced by the first air blower 60 can be reduced.

According to the present embodiment, when performing the second control C2 from the time of the activation of the projector 1, the controller 90 terminates the second control C2 when the period tc for which the second control C2 has been performed is longer than or equal to the predetermined period. The second control C2 can therefore be terminated at a preferable timing, for example, by experimentally determining in advance the period from the state in which no refrigerant W is present in the projector 1 to the state in which the refrigerant W is generated and delivered to the cooling target and setting the predetermined period to be longer than or equal to the determined period. In the example shown in FIG. 10, the refrigerant W reaches the cooling target at the time T3, at which the amount WA of generated refrigerant W becomes the value WAa. Therefore, even when the second control C2 is terminated at the time T3, the cooling target can be preferably cooled based on the vaporization of the refrigerant W after the time T3.

According to the present embodiment, when the projector 1 is activated for the first time, the controller 90 performs the second control C2 from the time of the activation of the projector 1. Insufficient cooling of the cooling target can therefore be suppressed even when no refrigerant W is delivered to the cooling target immediately after the projector 1 is activated for the first time.

According to the present embodiment, when the length of the period for which the projector 1 has been powered off is longer than or equal to the predetermined length, the controller 90 performs the second control C2 from the time of the activation of the projector 1. Therefore, even when the projector 1 has not been used for a long period, so that the refrigerant W in the projector 1 has all vaporized and disappeared, insufficient cooling of the cooling target can be suppressed immediately after the projector 1 is activated.

According to the present embodiment, the predetermined length described above is at least one week. Therefore, use of the projector 1 at a certain frequency does not cause the second control C2 to be performed when the projector 1 is activated and allows suppression of a decrease in the brightness of a color image (vide) projected immediately after the projector 1 is activated. On the other hand, when the projector 1 has not been used frequently enough to cause the refrigerant W in the projector 1 to disappear, the second control C2 can be preferably performed to suppress insufficient cooling of the cooling target. As described above, setting the predetermined length at least at one week allows the second control C2 to be preferably performed with degradation of the user's convenience suppressed.

According to the present embodiment, when the second control C2 is performed from the time of the activation of the projector 1, the period tc for which the second control C2 has been performed is longer than the period in which the projector 1 starts. The period tc for which the second control C2 is performed can therefore be readily ensured. The second control C2 can therefore be performed for a preferable length of time after the projector 1 is activated and until the refrigerant W is generated and delivered to the cooling target. Insufficient cooling of the cooling target can therefore be further suppressed.

According to the present embodiment, when the second control C2 is performed from the time of the activation of the projector 1, the period tc for which the second control C2 has been performed is longer than or equal to 5 minutes but shorter than or equal to 20 minutes. It takes at least several minutes to generate the refrigerant W and send the generated refrigerant W to the cooling target in many cases. Setting the period tc for which the second control C2 is performed to fall within the numerical range described above therefore allows the second control C2 to be performed for a more preferable length of time after the projector 1 is activated and until the refrigerant W is generated and delivered to the cooling target. Insufficient cooling of the cooling target can therefore be further suppressed.

According to the present embodiment, the cooling target is formed of the light modulators 4RP, 4GP, and 4BP. Reducing the luminance L of the light outputted from the light source apparatus 2 therefore allows heat generated by the light modulators 4RP, 4GP, and 4BP, which form the cooling target, to be preferably reduced. Therefore, when the cooling target is formed of the light modulators 4RP, 4GP, and 4BP, performing the luminance control LC in the second control C2 to reduce the luminance L of the light outputted from the light source apparatus 2 allows insufficient cooling of the cooling target to be more preferably suppressed.

For example, in the refrigerant generator 20, when the humidity of the air AR2 delivered from the second air blower 23 to the heat exchanger 30 is relatively low, cooling the heat exchanger 30 is unlikely to allow generation of the refrigerant W in some cases. For example, when air or any other substance outside the projector 1 mixes with the air AR2 delivered to the heat exchanger 30, the humidity of the air AR2 lowers in some cases.

In contrast, according to the present embodiment, the refrigerant generator 20 has the circulation path 27, through which the air AR2 discharged from the second air blower 23 circulates. Substantially sealing the circulation path 27 can therefore suppress entry of air outside the projector 1 into the circulation path 27, whereby the humidity of the air AR2 delivered to the heat exchanger 30 can be readily maintained relatively high. Cooling the heat exchanger 30 therefore allows the refrigerant W to be preferably generated.

According to the present embodiment, the heater 22 includes the heating main body 22a, which heats the air before passing through a portion of the moisture absorbing/discharging member 40 that is the portion located in the second region F2, and the second air blower 23. The heater 22, in which the second air blower 23 delivers the air AR2 to the moisture absorbing/discharging member 40, can therefore heat a portion of the moisture absorbing/discharging member 40 that is the portion located in the second region F2. The heater 22 can therefore heat the moisture absorbing/discharging member 40 even in the configuration in which the heating main body 22a is located in a position separate from the moisture absorbing/discharging member 40. The heater 22 can therefore be configured with improved flexibility.

According to the present embodiment, the refrigerant generator 20 includes the motor 24, which rotates the moisture absorbing/discharging member 40. The moisture absorbing/discharging member 40 can therefore be stably rotated at a fixed speed. Therefore, a portion of the moisture absorbing/discharging member 40 that is the portion located in the first region F1 can preferably absorb water vapor from the air AR1, and a portion of the moisture absorbing/discharging member 40 that is the portion located in the second region F2 can preferably discharge moisture into the air AR2. The refrigerant W can therefore be efficiently generated.

According to the present embodiment, the refrigerant sender 50 sends the refrigerant W based on capillarity. No pump or any other power source for sending the refrigerant W therefore needs to be separately provided. An increase in the number of parts of the projector 1 can therefore be suppressed, whereby the size and weight of the projector 1 are each readily reduced by a greater amount.

According to the present embodiment, the refrigerant sender 50 includes the connector 54, which is formed of a porous member and couples the refrigerant generator 20 to the cooling target. The connector 54 can therefore absorb the refrigerant W and send the refrigerant W based on capillarity.

According to the present embodiment, the refrigerant sender 50 includes the second catcher 52 provided in the second lid 33. The second catcher 52 is coupled to the connector 54. The second catcher 52 can therefore absorb the refrigerant W accumulated in the second lid 33 and send the absorbed refrigerant W to the connector 54 based on capillarity. The generated refrigerant W is therefore readily delivered with no waste to the cooling target.

According to the present embodiment, the refrigerant sender 50 includes the first catcher 51, which is provided in the first lid 32, and the third catcher 53, which couples the first catcher 51 to the second catcher 52. The first catcher 51 can therefore absorb the refrigerant W having accumulated in the first lid 32 and send the absorbed refrigerant W to the second catcher 52 via the third catcher 53 based on capillarity. The refrigerant W having accumulated in the first lid 32 can therefore be sent from the second catcher 52 to the connector 54, which can then send the refrigerant W to the cooling target. The generated refrigerant W is therefore readily delivered with no waste to the cooling target.

According to the present embodiment, the third catcher 53 passes through a pipe 31a. The third catcher 53 can therefore absorb the refrigerant W having accumulated in the pipe 31a and send the absorbed refrigerant W to the cooling target via the second catcher 52 and the connector 54. The generated refrigerant W is therefore readily delivered with no waste to the cooling target.

According to the present embodiment, the width of the connector 54 is greater, for example, than the width of the first catcher 51, the width of the second catcher 52, and the width of the third catcher 53. The width of the connector 54 is therefore readily set at a relatively large value, whereby the amount of refrigerant W that can be sent by the connector 54 can be increased. The refrigerant sender 50 therefore readily delivers the refrigerant W to the cooling target, whereby the cooling target is readily further cooled.

On the other hand, the width of the first catcher 51, the width of the second catcher 52, and the width of the third catcher 53 are each readily set at a relatively small value. The amount of refrigerant W held by each of the first catcher 51, the second catcher 52, and the third catcher 53 can therefore be reduced. The amount of refrigerant W held by the first catcher 51, the second catcher 52, and the third catcher 53 and hence left in the heat exchanger 30 can therefore be reduced, whereby the generated refrigerant W is readily delivered with no waste to the cooling target.

According to the present embodiment, the refrigerant holders 71, which hold the refrigerant W, are provided in the light modulation units 4R, 4G, and 4B, which form the cooling target. The refrigerant holders 71 therefore allow the refrigerant W sent to the light modulation units 4R, 4G, and 4B to be held in the light modulation units 4R, 4G, and 4B until the refrigerant W vaporizes. The generated refrigerant W is therefore readily used with no waste, whereby the cooling performance of the cooler 10 can be further improved.

According to the present embodiment, the refrigerant holders 71 are attached to surfaces of the light modulation units 4R, 4G, and 4B, which form the cooling target, and the refrigerant holders 71 are each formed of a porous member. At least part of each of the refrigerant holders 71 is exposed when viewed in the layering direction from the side facing the refrigerant holder 71. The refrigerant W therefore readily vaporizes via the exposed portion of each of the refrigerant holders 71, whereby the cooling performance of the cooler 10 can be further improved. Further, the refrigerant holders 71, which are each formed of a porous member, readily uniformly distribute the refrigerant W across the surfaces of the cooling target, which is provided with the refrigerant holders 71, based on capillarity, whereby the cooling target is readily further cooled.

For example, when the refrigerant holders 71 are fixed to the holding frames 80 with an adhesive, the pores in the refrigerant holders 71, which are each formed of a porous member, are closed in some cases with the adhesive absorbed by the refrigerant holders 71. The refrigerant holders 71 are therefore unlikely to absorb or hold the refrigerant W in some cases.

In contrast, according to the present embodiment, the fixing members 72 are so provided as to fix the refrigerant holders 71 in such a way that the fixing members 72 and the holding frames 80 sandwich the refrigerant holders 71. The refrigerant holders 71 can therefore be fixed to the holding frames 80 with use of no adhesive. The situation in which the refrigerant holders 71 are unlikely to hold the refrigerant W can therefore be suppressed. Further, in the present embodiment, the fixing members 72 are made of metal. The fixing members 72 therefore have relatively high thermal conductivity and are hence likely to be cooled. The air AR1 from the first air blower 60 and the vaporization of the refrigerant W therefore readily lower the temperature of the fixing members 72, whereby the cooling target, which is in contact with fixing members 72, is readily further cooled.

According to the present embodiment, the refrigerant holder 71 is provided on a surface of the holding frame 80 that is the surface facing the light incident side of the light modulator 4GP. The configuration described above can suppress influence of the water vapor that is the refrigerant W having vaporized from the refrigerant holder 71 on the light outputted from the light modulator 4GP to the light combining system 5 and can therefore suppress formation of noise in an image projected from the projector 1.

According to the present embodiment, the refrigerant holders 71 are provided in the plurality of light modulation units 4R, 4G, and 4B, and the linkage parts 73a and 73b, which each link a plurality of the refrigerant holders 71 to each other, are provided. Coupling the refrigerant sender 50 to one of the refrigerant holders 71 therefore allows the refrigerant W to be sent to the other refrigerant holders 71. The routing of the refrigerant sender 50 in the projector 1 can therefore be simplified.

According to the present embodiment, the linkage parts 73a and 73b are provided with the respective coatings 74, with which the linkage parts 73a and 73b are coated. A situation in which the refrigerant W that moves along the linkage parts 73a and 73b vaporizes via the linkage parts 73a and 73b can therefore be suppressed. Therefore, a situation in which the refrigerant W vaporizes without contributing to the cooling of the light modulation units 4R, 4G, and 4B, which form the cooling target, can be suppressed, whereby waste of the generated refrigerant W can be suppressed.

In the present embodiment, the connector 54 may also be coated, as are the linkage parts 73a and 73b. The configuration described above can suppress vaporization of the refrigerant W being sent to the cooling target. Therefore, the refrigerant W can be efficiently sent to the cooling target, and waste of the generated refrigerant W can be further suppressed. The circumference of each of the connector 54 and the linkage parts 73a and 73b may instead be covered, for example, with a tube. A coating treatment that suppresses the vaporization may still instead be performed on the surface of each of the connector 54 and the linkage parts 73a and 73b.

In the present embodiment, the following configurations and methods are also employable.

The controller may perform any control during the period for which the projector is in action as long as the controller performs one of the first control and the second control based on the information on the activation of the projector from the time of the activation of the projector. When performing the second control from the time of the activation of the projector, the controller may perform another type of control different from the first control after the second control is terminated. After terminating the second control, the controller may perform the second control again in place of the first control. In the second control, the controller may perform only one of the luminance control and the output control. The controller may change the control performed in the second control whenever the controller performs the second control.

The projector may include temperature sensors 100 indicated by the two-dot chain lines shown in FIG. 2. The temperature sensors 100 are each a sensor that measures the temperature of the cooling target. In FIG. 2, the temperature sensors 100 are provided at the light modulators 4RP, 4GP, and 4BP, which form the cooling target. When performing the second control from the time of the activation of the projector in the configuration described above, the controller may terminate the second control based on the temperature of the cooling target provided from the temperature sensors 100. When the refrigerant is delivered to the cooling target during the second control, the temperature of the cooling target abruptly lowers because the vaporization of the refrigerant also cools the cooling target. Detecting a change in the temperature of the cooling target with the temperature sensors 100 therefore allows detection of the fact that the refrigerant has reached the cooling target. Terminating the second control based on the temperature of the cooling target provided from the temperature sensors 100 therefore allows termination of the second control at a preferable timing.

When performing the second control from the time of the activation of the projector in the configuration described above, the controller may instead terminate the second control when the temperature of the cooling target provided from the temperature sensors 100 starts lowering at a rate of change greater than or equal to a predetermined value. The temperature of the cooling target abruptly lowers when the refrigerant reaches the cooling target and starts vaporizing during the second control, as described above. Detecting the fact with the temperature sensors 100 that the temperature of the cooling target starts lowering at a rate of change greater than or equal to the predetermined value therefore allows detection of the fact that the refrigerant has reached the cooling target. The second control can therefore be terminated at a more preferable timing.

During the first control, the controller may terminate the first control based on the temperature of the cooling target provided from the temperature sensors 100 described above and may perform the second control. Specifically, during the first control, the controller may terminate the first control when the temperature of the cooling target provided from the temperature sensors 100 is higher than or equal to a predetermined value and may perform the second control. According to the configuration described above, when the temperature of the cooling target becomes a value higher than or equal to the predetermined value, the temperature of the cooling target can be lowered by performing the second control. Insufficient cooling of the cooling target can, for example, be further suppressed during the action of the projector.

The heater is not limited to that in the embodiment described above. The heater may be in contact with the moisture absorbing/discharging member and heat the moisture absorbing/discharging member. In this case, the heater may not heat the air before passing through the moisture absorbing/discharging member.

The cooling air blower in the embodiment described above is the first air blower 60 provided in the refrigerant generator 20, but not necessarily. The cooling air blower may be provided separately from the air blowers provided in the refrigerant generator 20.

The cooling target in the embodiment described above is the light modulation units, but not necessarily. The cooling target may include at least one of the light modulators, the light modulation units, the light source apparatus, a wavelength converter that converts the wavelength of the light outputted from the light source apparatus, a diffuser that diffuses the light outputted from the light source apparatus, and a polarization converter that converts the polarization direction of the light outputted from the light source apparatus. According to the configuration described above, each portion of the projector can be cooled in the same manner described above.

In the embodiment described above, the description has been made with reference to the case where the present disclosure is applied to a transmission-type projector, and the present disclosure is also applicable to a reflection-type projector. The term "transmission-type" means that the light modulators each including a liquid crystal panel or any other component transmit light. The term "reflection-type" means that the light modulators reflect light. The light modulators are each not limited, for example, to a liquid crystal panel and may, for example, be a micromirror-based light modulator.

In the embodiment described above, the projector using the three light modulators has been presented by way of example. The present disclosure is also applicable to a projector using only one light modulator and a projector using four or more light modulators.

The configurations and methods described in the present specification can be combined with each other as appropriate to the extent that the combination causes no contradiction between the combined configurations or methods.

What is claimed is:

1. A projector including a cooling target, the projector comprising:
   a light source configured to emit light;
   a light modulator configured to modulate the light emitted from the light source in accordance with an image signal;
   a projection optical apparatus configured to project the light modulated by the light modulator;
   a cooler configured to cool the cooling target based on transformation of a refrigerant into a gas;
   a temperature sensor configured to measure a temperature of the cooling target; and
   a controller configured to control at least one of the cooler and the light source,
   wherein the cooler includes
      a refrigerant generator configured to generate the refrigerant,
      a refrigerant sender configured to send the generated refrigerant toward the cooling target, and
      a cooling air blower configured to deliver air to the cooling target,
   the controller is configured to perform a first control and a second control, the first and second controls which control at least one of the cooling air blower and the light source,
   the controller performs one of the first control and the second control based on information on activation of the projector from a time of the activation of the projector,
   in the second control, the controller performs at least one of a luminance control and an output control, the luminance control which reduces luminance of the light outputted from the light source in the second control to a value smaller than the luminance of the light outputted from the light source in the first control, and the output control which increases output of the cooling air blower in the second control to a value larger than the output of the cooling air blower in the first control, and
   when performing the second control from the time of the activation of the projector, the controller terminates the second control based on the temperature of the cooling target provided from the temperature sensor and then performs the first control.

2. The projector according to claim 1,
   wherein the controller performs both the luminance control and the output control in the second control.

3. The projector according to claim 1,
   wherein when performing the second control from the time of the activation of the projector and a period for which the second control was performed is longer than or equal to a predetermined period, the controller terminates the second control.

4. The projector according to claim 1,
   wherein when performing the second control from the time of the activation of the projector and the temperature of the cooling target provided from the temperature sensor starts lowering at a rate of change greater than or equal to a predetermined value, the controller terminates the second control.

5. The projector according to claim 1,
   wherein during the first control, the controller terminates the first control based on the temperature of the cooling target provided from the temperature sensor and performs the second control.

6. The projector according to claim 5,
   wherein during the first control, the controller terminates the first control when the temperature of the cooling target provided from the temperature sensor is higher than or equal to a predetermined value, and performs the second control.

7. The projector according to claim 1,
   wherein the information on the activation of the projector includes a number of the activation of the projector, and
   when the projector is activated for the first time, the controller performs the second control from the time of the activation of the projector.

8. The projector according to claim 1,
   wherein the information on the activation of the projector includes a length of an off period for which the projector was powered off, and
   when the length of the off period is longer than or equal to a predetermined length, the controller performs the second control from the time of the activation of the projector.

9. The projector according to claim 8,
   wherein the predetermined length is at least one week.

10. The projector according to claim 1,
    wherein when the second control is performed from the time of the activation of the projector, an execution period of time for which the second control was performed is longer than or equal to a period of a startup time of the projector.

11. The projector according to claim 10,
    wherein when the second control is performed from the time of the activation of the projector, the execution period is longer than or equal to 5 minutes but shorter than or equal to 20 minutes.

12. The projector according to claim 1,
    wherein the cooling target is the light modulator.

13. A projector including a cooling target, the projector comprising:
    a light source configured to emit light;
    a light modulator configured to modulate the light emitted from the light source in accordance with an image signal;
    a projection optical apparatus configured to project the light modulated by the light modulator;
    a cooler configured to cool the cooling target based on transformation of a refrigerant into a gas; and
    a controller configured to control at least one of the cooler and the light source,
    wherein the cooler includes
       a refrigerant generator configured to generate the refrigerant,
       a refrigerant sender configured to send the generated refrigerant toward the cooling target, and
       a cooling air blower configured to deliver air to the cooling target,
    the controller is configured to perform a first control and a second control, the first and second controls which control at least one of the cooling air blower and the light source, the controller performs one of the first control and the second control based on information on activation of the projector from a time of the activation of the projector, in the second control, the controller performs at least one of a luminance control and an output control, the luminance control which reduces luminance of the light outputted from the light source in the second control to a value smaller than the luminance of the light outputted from the light source in the first control, and the output control which increases output of the cooling air blower in the second control to a value larger than the output of the cooling air blower in the first control, the information on the activation of the projector includes a length of an off period for which the projector was powered off, when the length of the off period is longer than or equal to a predetermined length, the controller performs the second control from the time of the activation of the projector, and the predetermined length is at least one week.

14. A projector including a cooling target, the projector comprising:

a light source configured to emit light;

a light modulator configured to modulate the light emitted from the light source in accordance with an image signal;

a projection optical apparatus configured to project the light modulated by the light modulator;

a cooler configured to cool the cooling target based on transformation of a refrigerant into a gas; and a controller configured to control at least one of the cooler and the light source, wherein the cooler includes a refrigerant generator configured to generate the refrigerant, a refrigerant sender configured to send the generated refrigerant toward the cooling target, and a cooling air blower configured to deliver air to the cooling target, the controller is configured to perform a first control and a second control, the first and second controls which control at least one of the cooling air blower and the light source, the controller performs one of the first control and the second control based on information on activation of the projector from a time of the activation of the projector, and in the second control, the controller performs at least one of a luminance control and an output control, the luminance control which reduces luminance of the light outputted from the light source in the second control to a value smaller than the luminance of the light outputted from the light source in the first control, and the output control which increases output of the cooling air blower in the second control to a value larger than the output of the cooling air blower in the first control, when the second control is performed from the time of the activation of the projector, an execution period of time for which the second control was performed is longer than or equal to a period of a startup time of the projector, and when the second control is performed from the time of the activation of the projector, the execution period is longer than or equal to 5 minutes but shorter than or equal to 20 minutes.

* * * * *